US008489736B2

(12) United States Patent
Takenouchi

(10) Patent No.: US 8,489,736 B2
(45) Date of Patent: Jul. 16, 2013

(54) MEDIATION DEVICE, MEDIATION METHOD AND MEDIATION SYSTEM

(75) Inventor: Takao Takenouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 115 days.

(21) Appl. No.: 13/254,304

(22) PCT Filed: Mar. 15, 2010

(86) PCT No.: PCT/JP2010/054738
§ 371 (c)(1),
(2), (4) Date: Sep. 1, 2011

(87) PCT Pub. No.: WO2010/110182
PCT Pub. Date: Sep. 30, 2010

(65) Prior Publication Data
US 2012/0005340 A1  Jan. 5, 2012

(30) Foreign Application Priority Data
Mar. 24, 2009  (JP) .................................. 2009-071216

(51) Int. Cl.
*G06F 15/16* (2006.01)
(52) U.S. Cl.
USPC ............ 709/224; 709/227; 709/228; 345/633
(58) Field of Classification Search
USPC ........................... 709/224, 227, 228; 345/633
See application file for complete search history.

(56) References Cited

U.S. PATENT DOCUMENTS

| 7,253,086 B2 * | 8/2007 | Hall ............................. 438/595 |
| 8,355,531 B2 * | 1/2013 | Aratani et al. ................. 382/103 |
| 2007/0238472 A1 * | 10/2007 | Wanless ......................... 455/461 |
| 2010/0191487 A1 * | 7/2010 | Rada et al. ...................... 702/60 |

FOREIGN PATENT DOCUMENTS

| JP | 10-105612 A | 4/1998 |
| JP | 2003006161 A | 1/2003 |
| JP | 2005209118 A | 8/2005 |
| JP | 2008257434 A | 10/2006 |

(Continued)

OTHER PUBLICATIONS

International Search Report for PCT/JP2010/054738 mailed Jun. 29, 2010.

(Continued)

*Primary Examiner* — Khanh Dinh

(57) ABSTRACT

Hiding a service providing server from an authentication server is incompatible with involving the service providing server in the selection of the authentication server. An authentication mediation server (400) comprises a authentication server reliance condition storage unit (510) which stores a first identifier to specify at least one service providing server (100) in association with reliance conditions to authentication servers (200) in the service providing server (100); a user usage authentication server storage unit (520) which stores second identifiers to specify the respective plurality of authentication servers (200) in association with a third identifier to specify a user who uses the authentication servers (200); a high reliance authentication server calculation unit (460) which calculates degrees of reliance for the respective authentication servers (200), on the basis of the reliance conditions to the authentication servers (299) which are associated with the first identifier extracted from the authentication server reliance condition storage unit (519); and an authentication server selection unit (440) which selects a second identifier having the degree of reliance which satisfies a previously provided condition, from the second identifiers associated with the third identifier extracted from the user usage authentication server storage unit (520).

30 Claims, 24 Drawing Sheets

FOREIGN PATENT DOCUMENTS

| | | |
|---|---|---|
| JP | 2007328411 A | 12/2007 |
| JP | 2008009630 A | 1/2008 |
| JP | 2008282212 A | 11/2008 |

OTHER PUBLICATIONS

Security Assertion Markup Language (SAML) V2.0 Technical Overview, Committee Draft 02, OASIS, Mar. 25, 2008, <Internet>, http://www.oasis-open.org/committees/downicad.php/27819/sstc-saml-tech-overview-2.0-cd-02.pdf.

OpenID Authentication 2.0—Final, OpenID Foundation, Dec. 5, 2007, <Internet>, http://openid.net/specs/openid-authentication-2_0.html.

\* cited by examiner

Fig.3

| User-ID | IdP-ID |
|---|---|
| Alice | IdP_1 |
| Alice | IdP_2 |
| Alice | IdP_3 |
| Bob | IdP_1 |
| Bob | IdP_2 |

521
USER USAGE AUTHENTICATION
SERVER INFORMATION

Fig.7

| Proxy-User-ID IN AUTHENTICATION MEDIATION SERVER | IdP-User-ID IN AUTHENTICATION SERVER |
|---|---|
| Alice | alice@idp1 |
| Alice | a@idp2 |
| Alice | userA@idp3 |
| Bob | bob@idp1 |
| Bob | b@idp2 |

501 USER ID COOPERATION INFORMATION

Fig.9

| Proxy-User-ID IN AUTHENTICATION MEDIATION SERVER | SP-User-ID IN AUTHENTICATION SERVER |
|---|---|
| Alice | alice@sp1 |
| Bob | bob@sp1 |

504 USER ID COOPERATION INFORMATION

Fig.12

| SP-ID | IdP-ID | CHARACTERISTICS CONDITION INFORMATION |
|---|---|---|
| SP_1 | IdP_1, IdP_2 | IdP USING AUTHENTICATION METHOD OF PKI AUTHENTICATION AND ONE-TIME PASSWORD |
| SP_2 | IdP_2, IdP_3 | IdP RECEIVING ACCREDITATION OF ISMS INFORMATION SECURITY MANAGEMENT |
| SP_3 | IdP_4 | IdP OPERATED BY COMMUNICATION CARRIERS |
| SP_4 | IdP_4 | IdP WITH USERS OF MORE THAN ONE MILLION PEOPLE |
| SP_5 | IdP_3, IdP_4, IdP_5 | IdP OPERATED IN JAPAN |

514 AUTHENTICATION SERVER RELIANCE CONDITION

Fig.13

| IdP-ID | CHARACTERISTICS INFORMATION OF AUTHENTICATION SERVER |
|---|---|
| IdP_1 | AUTHENTICATION METHOD USING ONE-TIME PASSWORD |
| IdP_2 | AUTHENTICATION METHOD USING PKI |
| IdP_3 | USERS OF MORE THAN TWO MILLION |
| IdP_4 | OPERATED IN JAPAN |
| IdP_5 | HAS OBTAINED ACCREDITATION OF ISMS INFORMATION SECURITY MANAGEMENT |

531 AUTHENTICATION SERVER INFORMATION

Fig.16

| User-ID OF USER | SP-ID OF SERVICE PROVIDING SERVER | DATE AND TIME OF AUTHENTICATION INFORMATION PROVIDED |
|---|---|---|
| Claire | SP_1 | 2008.11.20 10:00 |
| Claire | SP_2 | 2008.11.20 10:10 |
| Claire | SP_3 | 2008.11.22 10:00 |
| Dave | SP_1 | 2008.11.21 10:00 |
| Dave | SP_2 | 2008.11.21 10:10 |

541 AUTHENTICATION HISTORY INFORMATION

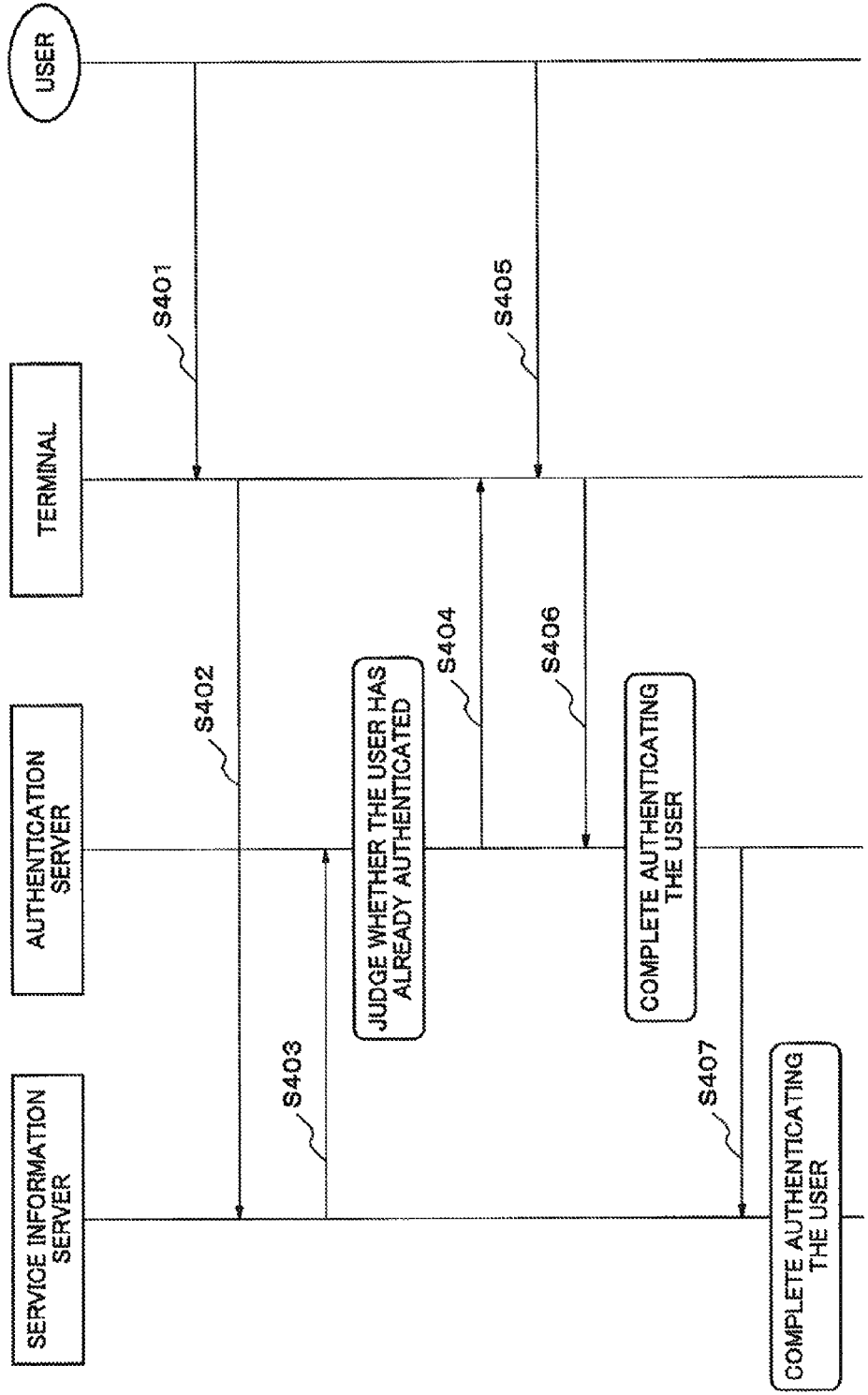

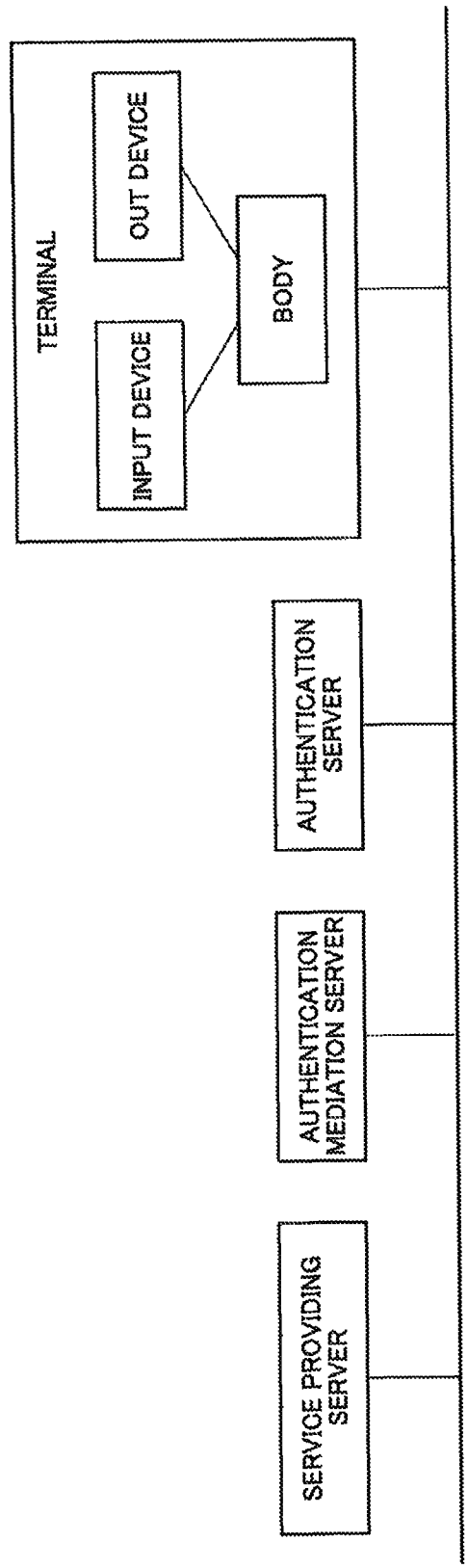

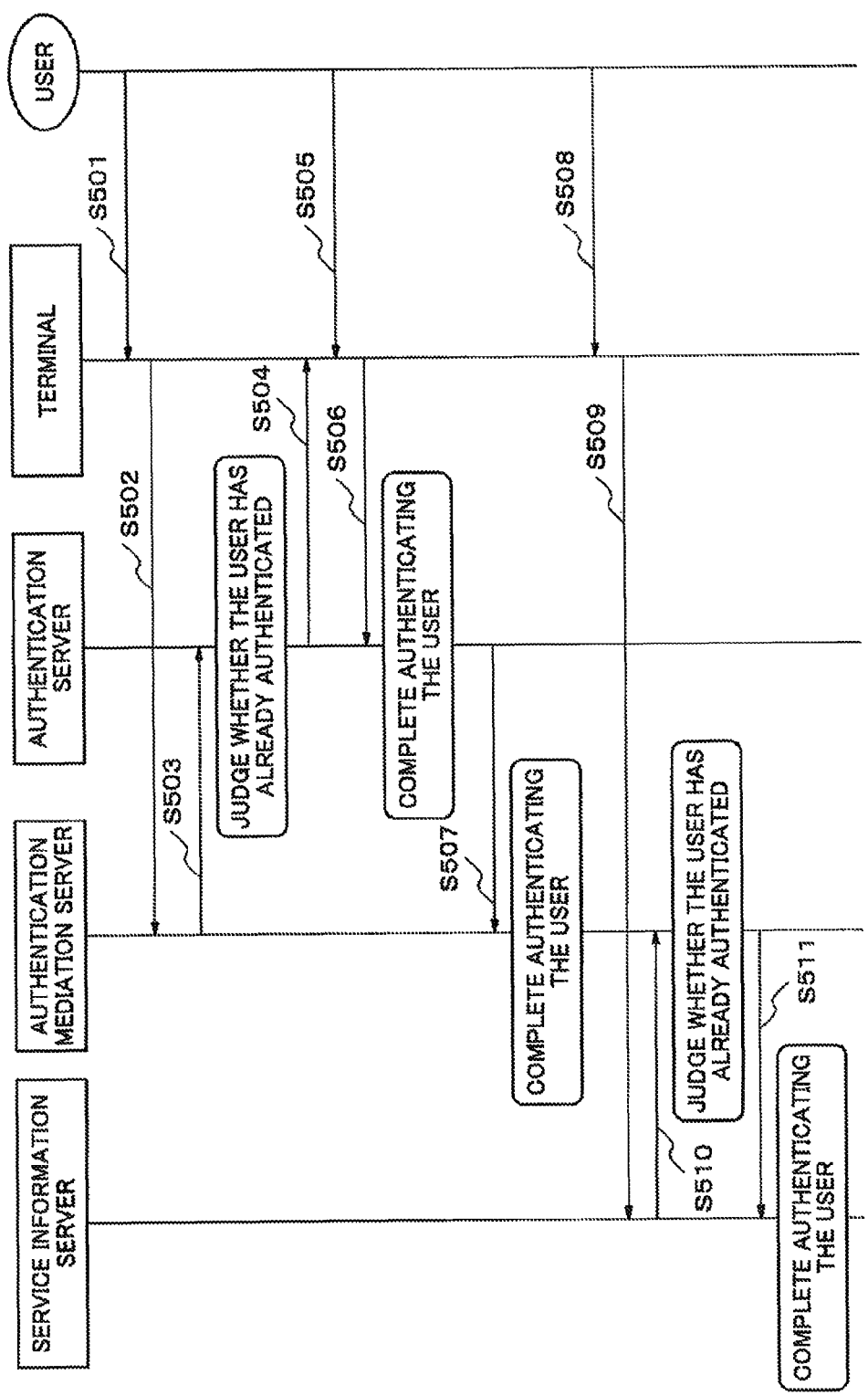

MEDIATION DEVICE, MEDIATION METHOD AND MEDIATION SYSTEM

TECHNICAL FIELD

The present invention relates to a mediation device, a mediation method, a program and a mediation system and relates to a mediation device, a mediation method, a program and a mediation system, that select a server suitable for requests of a plurality of use sides.

BACKGROUND ART

In a general authentication system, when a service providing server authenticates a user, the service providing server does not authenticate the user directly, and a method to authenticate the user based on user authentication information which an authentication server has issued is considered. For such authentication method, there are "SAML (Security Assertion Markup Language)" indicated by non-patent document 1 and "OpenID (Open Identifier)" indicated by non-patent document 2, or the like.

By adopting such authentication method, the service providing servers do not need to have an authentication function such as the password administrative function, and the service providing servers do not need to individually mount the authentication function respectively.

An example of a system using such authentication server will be described. As shown in FIG. 21, the system is composed of a terminal equipped with an input/output device with the user, an authentication server, and a service providing server. FIG. 22 is a sequence diagram showing an operation of the system. Using FIG. 21 and FIG. 22A, the operation which the service providing server authenticates the user using the authentication server will be described.

First, in order to receive service from a service providing server, the user inputs "user ID (IDENTIFIER)", "address of a service providing server", and "information on the authentication server" to a terminal (Step S401).

Next, the terminal which received the input makes access to the service providing server and passes "user ID" and "information on the authentication server" (Step S402).

The service providing server requests the authentication server "the user authentication information" which indicates the effect that the user indicated by "user ID" was authenticated (Step S403).

Next, if the user indicated by "user ID" has already been authenticated, the authentication server sends "the user authentication information" to the service providing server (this step is not shown). If the user indicated by "user ID" has not been authenticated yet, the authentication server requests the terminal to display a screen which requests a password input for authentication to the user (Step S404).

Next, the terminal displays a screen of password prompt and sends "password" which the user inputted to the authentication server (Steps S405 and S406).

Next, the authentication server judges whether "password" matches the value set in advance, and when matching, authenticates the user.

Next, when the user is authenticated, the authentication server sends "the user authentication information" to the service providing server (Step S407).

The service providing server, by receiving "the user authentication information" from the authentication server, authenticates the user.

By the above mentioned operation, an authentication method using the authentication server authenticating the user not by the service providing server authenticating the user directly but by trusting the user authentication information issued by the authentication server, is provided.

The authentication method using the above-mentioned authentication server, when the authentication server has been managed by a specific telecommunications carrier, information on the authentication server which the user is using is known by the service providing server. As a result, there was a problem that a service provider can guess information on which telecommunications carrier the user is belonging to.

Technology to solve such problem is disclosed in patent document 1. Technology of patent document 1, in order to hide information on the authentication server which the user is using from a service providing server, has an authentication mediation server which mediates the transmission and reception of authentication information between a service providing server and an authentication server.

Technology of patent document 1, for example has a system configuration as FIG. 23, and a logical connection of the authentication server and the service providing server is performed via the authentication mediation server. By mediating the authentication mediation server, because the service providing server does not communicate with the authentication server directly, the service providing server can hide information on the authentication server from the service provider.

FIG. 24 is a sequence diagram showing an operation of the system. Using FIG. 23 and FIG. 24A, the operation of the service providing server to authenticate the user via the authentication mediation server will be described.

First, the user, in order to receive authentication by the authentication mediation server, inputs "user ID", "address of the authentication mediation server" and "information on the authentication server" to a terminal (Step S501).

Next, the terminal which received this input makes access to the authentication mediation server and passes "user ID" and "information on the authentication server" (Step S502).

Then, by the same operation as an example of the authentication method using the authentication server, the user is authenticated from the authentication server, and the user authentication information is sent to the authentication mediation server (Steps S503-S507). The user authentication information hereof is information that the user indicated by "user ID" is authenticated by the authentication server.

In addition, the authentication mediation server, by trusting the user authentication information from the authentication server, has the user to be authenticated.

Next, the user, in order to receive service from the service providing server, inputs "user ID", "address of the service providing server" and "information on the authentication mediation server" to a terminal (Step S508).

Next, the terminal which received this input makes access to the service providing server and passes "user ID" and "information on the authentication mediation server" (Step S509).

Next, the service providing server, to the information on the authentication mediation server, requests "the user authentication information" which indicates the effect that the user indicated by "user ID" was authenticated (Step S510).

Then, the authentication mediation server, because it has already authenticated the user, sends "the user authentication information" to the service providing server (Step S511). The user authentication information hereof is the information that the user indicated by "user ID" is authenticated by the authentication mediation server. In other words, in the user authentication information hereof, information on the authentication server is not included.

The service providing server, by trusting the user authentication information from the authentication mediation server, has the user to be authenticated.

As seen as above, by having the authentication mediation server mediating authentication information between the service providing server and the authenticate server, the service providing server does not communicate directly with the authentication server. Further, because information on the authentication server is not included in the user authentication information which the authentication mediation server issues, information on the authentication server can be hidden from the service providing server. As a result, which authentication server the user is using can be hidden from a service provider, and the user's privacy can be protected.

On the other hand, technology that selects an appropriate certificate authority from a plurality of certificate authorities is disclosed in patent document 2. Technology described in patent document 2 is a technology that a user device obtains a certificate authority list for stores from a store device, and compared with a certificate authority list for visitors which one has, selects a suitable certificate authority.

Further, another technology that selects an appropriate certificate authority from a plurality of certificate authorities is disclosed in patent document 3. Technology described in patent document 3 is a technology that, based on a record of the number of successful authentication corresponding to each authentication server, selects an authentication server.

PATENT DOCUMENTS

[Patent document 1] Japanese Patent Application Laid-Open No. 2008-009630
[Patent document 2] Japanese Patent Application Laid-Open No. 1998-105612
[Patent document 3] Japanese Patent Application Laid-Open No. 2007-328411

NON-PATENT DOCUMENTS

[Non-patent document 1] FIG. 12 SP-Initiated SSO with Redirect and POST Bindings. Security Assertion Markup Language (SAML) V2.0 Technical Overview. OASIS Security Services (SAML) TC. Retrieved Nov. 25, 2008, from http://www.oasis-open.org/committees/download.php/27819/sstc-saml-tech-overview-2.0-cd-02.pdf
[Non-patent document 2] 3. Protocol Overview. OpenID Authentication 2.0 the one of the—Final. OpenID Foundation. Retrieved Nov. 25, 2008, from http://openid.net/specs/openid-authentication-2_0.html

SUMMARY OF THE INVENTION

Problem to be Solved by the Invention

However, in the technology described in documents mentioned above, there was a problem that it is incompatible to hide an authentication server from a service providing server and to involve the service providing server in selecting the authentication server.

This is because, when the authentication mediation server of patent document 1 is introduced, the service providing server cannot know information of which authentication server the user is using. Accordingly, the service providing server cannot make a judgment of whether to trust or not to trust the authentication server based on information on the authentication server. As a result, in a system using the authentication mediation server mentioned in the background art, a judgment of whether the authentication mediation server trust the authentication server or not is performed, and the service providing server had to follow the judgmental standard of the authentication mediation server.

However, when in a situation of a large number of companies are managing the authentication server, it was possible that the authentication servers of low reliability exist, and it was also difficult to trust the authentication mediation server completely.

That is, for a request to hide information of the authentication server from the service providing server and for a request to reflect the standard of the service providing server side in the rating of reliability of the authentication server, there were no means for solving the problems which will satisfy both requests simultaneously.

The object of the present invention is to provide a mediation device, a mediation method, a program and a mediation system, which solve the problem mentioned above.

Means for Solving a Problem

A mediation device of the present invention includes a reliance condition storage unit which stores a first identifier to specify at least one of first information processing devices and stores associating with the first identifier, reliance conditions a second information processing device in the first information processing devices;

a usage target storage unit which stores second identifiers to specify the respective plurality of the second information processing devices and stores associating with the second identifiers, a third identifier to specify a user who makes the second information processing devices as a usage target;

a calculation unit which calculates the reliability for the respective second information processing device based on the reliance conditions to the second information processing devices which are associated with the first identifier extracted from the reliance condition storage unit; and a selection unit which selects the second identifier including the reliability which satisfies a condition given in advance, from the second identifiers associated with the third identifier extracted from the usage target storage unit.

A mediation method of the present invention calculates the reliability for the respective plurality of second information processing device based on the reliance conditions to the second information processing devices which are associated with the first identifier extracted from the reliance condition information associated the first identifier to specify at least one of the first information processing devices with the reliance condition to the second information processing devices in the first information processing devices; and selects the second identifier including the reliability which satisfies a condition given in advance, from the second identifiers associated with the third identifier extracted from the usage target information associated second identifiers to specify the respective plurality of the second information processing devices with a third identifier to specify a user who makes the second information processing devices as a usage target.

A program of the present invention makes a computer to execute the process of calculating the reliability for the respective plurality of second information processing device based on the reliance conditions to the second information processing devices which are associated with the first identifier extracted from the reliance condition information associated a first identifier to specify at least one of the first information processing devices with the reliance condition to the second information processing devices in the first information processing device; and selecting the second identifier including the reliability which satisfies a condition given in advance, from the second identifiers associated with the third identifier extracted from the usage target information associated second identifiers to specify the respective plurality of the second information processing devices with a third identifier to specify a user who makes the second information processing devices as a usage target.

A mediation system of the present invention includes a first information processing device, a second information processing device, a third information processing device and a mediation device connected with each other by a network;

wherein the third information processing device sends an identifier of an mediation device and a third identifier to the first information processing device;

wherein the first information processing device, based on an identifier of the received mediation device, sends the third identifier and first identifier to the mediation device;

wherein the mediation device includes a reliance condition storage unit which stores a first identifier to specify at least one of first information processing devices and stores associating with the first identifier, reliance conditions a second information processing device in the first information processing devices;

a usage target storage unit which stores second identifiers to specify the respective plurality of the second information processing devices and stores associating with the second identifiers, a third identifier to specify a user who makes the second information processing devices as a usage target;

a calculation unit which calculates the reliability for the respective second information processing devices based on the reliance conditions to the second information processing devices which are associated with the first identifier extracted from the reliance condition storage unit; and a selection unit which selects the second identifier including the reliability which satisfies a condition given in advance, from the second identifiers associated with the third identifier extracted from the usage target storage unit.

Effect of the Invention

According to the present invention, it is possible to satisfy both of hiding an authentication server from a service providing server and involving the service providing server in the selection of the authentication server.

BRIEF DESCRIPTION OF THE DRAWINGS

FIG. 3 is a diagram showing a structure of the user usage authentication server information of the first to seventh exemplary embodiment of the present invention.

FIG. 7 is a diagram showing a structure of the user. ID cooperation information of the first to third exemplary embodiment of the present invention.

FIG. 9 is a diagram showing a structure of the user ID cooperation information of the first to third exemplary embodiment of the present invention.

FIG. 12 is a diagram showing a structure of the authentication server reliance condition information of the fourth exemplary embodiment of the present invention.

FIG. 13 is a diagram showing a structure of the authentication server information on the fourth exemplary embodiment of the present invention.

FIG. 16 is a diagram showing a structure of an authentication history information on the fifth exemplary embodiment of the present invention.

FIG. 22 is a sequence diagram showing an operation of the system using the authentication server of the background art.

FIG. 23 is a configuration diagram of a system using an authentication mediation server of the background art.

FIG. 24 is a sequence diagram showing an operation of a system using the authentication mediation server of the background art.

EXEMPLARY EMBODIMENTS FOR CARRYING OUT OF THE INVENTION

Next, the exemplary embodiments of the present invention will be described in detail with reference to the drawings.

First, the terms will be described.

A user ID (also called as a third identifier) is an identifier which identifies the user uniquely. The user ID is expressed as User-ID.

A service providing server ID (also called as a first identifier) is an identifier which identifies a service providing server (also called as a first information processing device) uniquely. The service providing server ID is expressed as SP-ID.

An authentication server ID (also called as a second identifier) is an identifier which identifies an authentication server (also called as the second information processing device) uniquely. The authentication server ID is expressed as IdP-ID.

An authentication mediation server ID (also called as an identifier of an mediation device) is an identifier which identifies an authentication mediation server (also called as an mediation device) uniquely. The authentication mediation server ID is expressed as Proxy-ID.

User authentication is to make sure that the user is the user person registered in advance.

A user authentication information is the information which proves that user authentication has been performed. For example, when a server which has received the user authentication information trusts a server which issued the user authentication information, a server which has received the user authentication information may trust the user authentication information and decide to have authenticated the user.

The First Exemplary Embodiment

Figure 1:
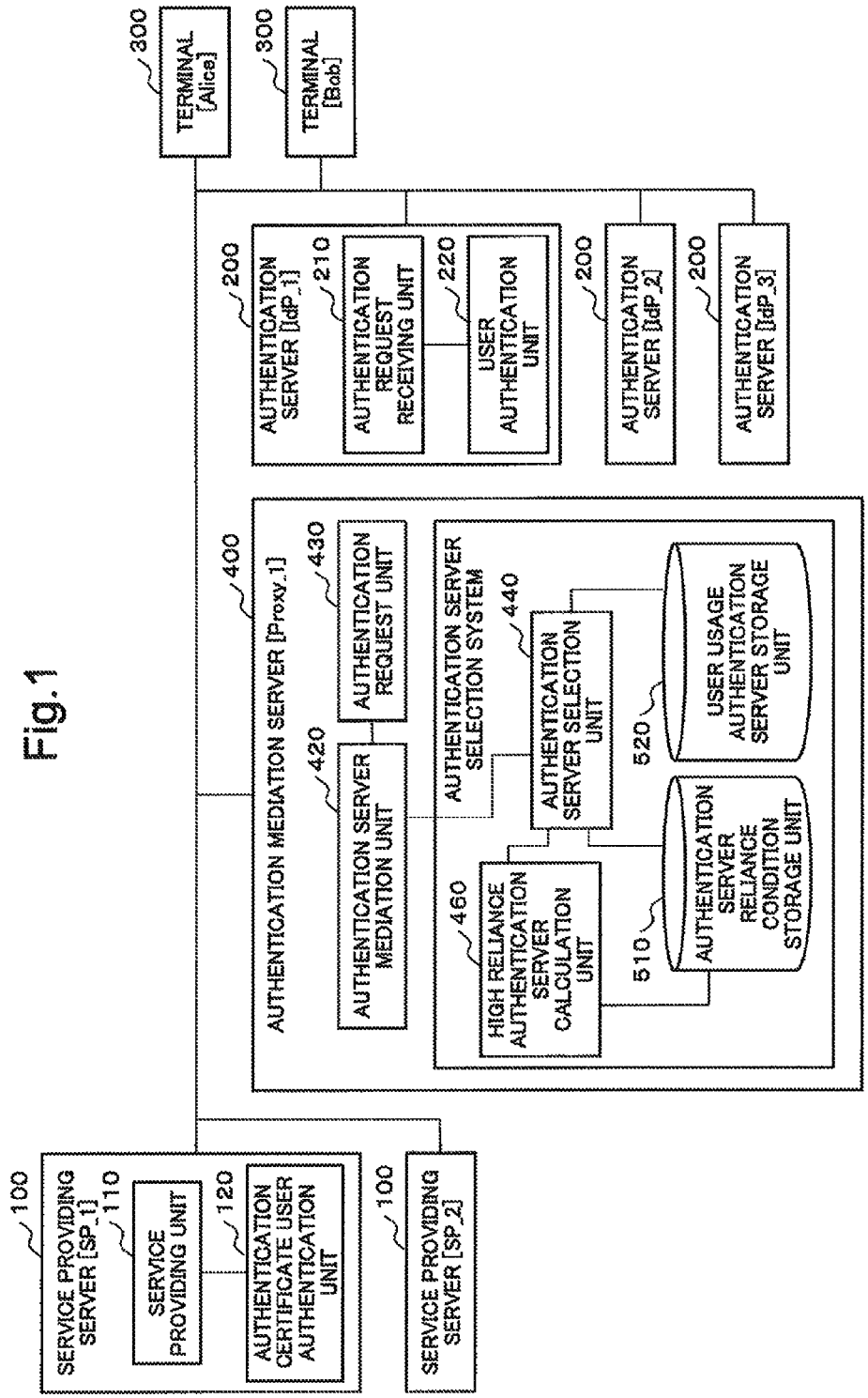
FIG. 1 is a block diagram showing a composition of a first to third exemplary embodiment of the present invention.

Next, a first exemplary embodiment of the present invention will be described in detail with reference to the drawings. FIG. 1 is a block diagram showing a composition of the present exemplary embodiment.

Referring to FIG. 1, the first exemplary embodiment of the present invention is composed of a service providing server 100, an authentication mediation server 400, an authentication server 200, and a terminal 300 connected by a network with each other.

The service providing server 100, the authentication server 200, the terminal 300, and the authentication mediation server 400 each may be, for example, computers and information processing devices.

The unit numbers or the ratio of each of the unit numbers of the service providing server 100, the authentication server 200, the terminal 300, and the authentication mediation server 400 may be of any number in spite of an example of the present exemplary embodiment.

The service providing server 100 includes a service providing unit 110 and an authentication certificate user authentication unit 120.

The authentication mediation server 400 includes an authentication server mediation unit 420, an authentication request unit 430, a high reliance authentication server calculation unit 460, an authentication server selection unit 440, an authentication server reliance condition storage unit 510, and an user usage authentication server storage unit 520. Further, the high reliance authentication server calculation unit 460 is also called as a calculation unit. The authentication server selection unit 440 is also called as a selection unit. The authentication server reliance condition storage unit 510 is also called as a reliance condition storage unit. The user usage authentication server storage unit 520 is also called as a usage target storage unit.

The authentication server 200 includes an authentication request receiving unit 210 and a user authentication unit 220.

The service providing unit 110 of the service providing server 100 includes the function to receive User-ID from the terminal 300 and the function to send User-ID to the authentication certificate user authentication unit 120. The authentication certificate user authentication unit 120 of the service providing server 100 includes the function to receive User-ID and the function to send User-ID and SP-ID which is the source of User-ID to the authentication server mediation unit 420 of the authentication mediation server 400.

The authentication server mediation unit 420 of the authentication mediation server 400 includes the function to receive User-ID and SP-ID, the function to send User-ID and SP-ID to the authentication server selection unit 440, and the function to send User-ID and IdP-ID of the selected authentication server 200 to the authentication request unit 430.

The authentication request unit 430 of the authentication mediation server 400 includes the function to receive User-ID and IdP-ID. Further, the authentication request unit 430 includes the function to send Proxy-ID which uniquely identifies the authentication mediation server 400 which the authentication request unit 430 itself is loaded to and the received User-ID to the authentication request receiving unit 210 of the authentication server 200 identified by IdP-ID uniquely.

Figure 2:
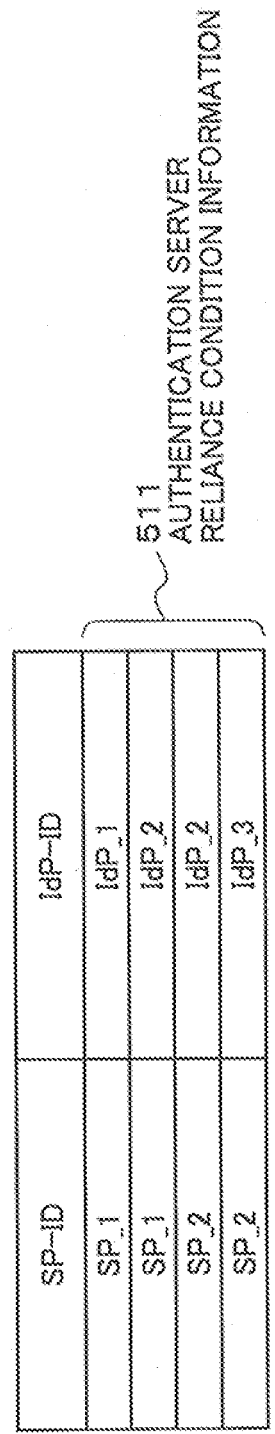
FIG. 2 is a diagram showing a structure of an authentication server reliance condition information of the first, the third and a fifth to a seventh exemplary embodiment of the present invention.

The authentication server reliance condition storage unit 510 of the authentication mediation server 400 includes the function to store an authentication server reliance condition information 511 as shown in FIG. 2 which associated SP-ID with a reliance condition defined in advance corresponded to the service providing server 100 identified by the SP-ID uniquely. Further, the authentication server reliance condition information 511 is also called as a reliance condition information. The reliance condition in the present exemplary embodiment, for example as shown in FIG. 2, is IdP-ID which identifies the authentication server 200 which is defined to be trusted from the service providing server 100 uniquely. Further, the authentication server reliance condition storage unit 510 for example may be a database system which returns the corresponding information (the reliance condition, for example) associated with presented condition information (SP-ID, for example) in a list form.

The user usage authentication server storage unit 520 of the authentication mediation server 400 includes the function to store a user usage authentication server information 521 as shown in FIG. 3 which associated User-ID with IdP-ID which uniquely identifies the authentication server 200 which is the usage target of a user 390 identified by the User-ID uniquely. Further, the user usage authentication server information 521 is also called as a usage target information. The user usage authentication server storage unit 520, for example, may be a database system which returns corresponding information (IdP-ID, for example) associated with presented condition information (User-ID, for example) in a list form.

The authentication server selection unit 440 of the authentication mediation server 400 includes a function to receive User-ID and SP-ID. Further, the authentication server selection unit 440 includes a function to obtain the condition of the authentication server 200 which is defined being trusted from the service providing server 100 uniquely identified by SP-ID, from the authentication server reliance condition storage unit 510. Further, the authentication server selection unit 440 includes a function to obtain a list of IdP-ID of the authentication server 200 which is the usage target of a user 390 uniquely identified by User-ID, from the user usage authentication server storage unit 520. Further, the authentication server selection unit 440 includes a function to extract the authentication server 200 which satisfies the condition of the obtained authentication server 200 and which is the usage target of the user 390.

The authentication server selection unit 440 of the authentication mediation server 400 includes a function to send a list of IdP-ID of the extracted authentication server 200 to the high reliance authentication server calculation unit 460. Further, the authentication server selection unit 440 includes a function to receive the reliability of the authentication server 200, a function, by referring to the received reliability, to select the authentication server 200 which includes the highest reliability, and a function to send IdP-ID of the selected authentication server 200 to the authentication server mediation unit 420.

The high reliance authentication server calculation unit 460 of the authentication mediation server 400 includes a function to receive a list of IdP-ID which the authentication server selection unit 440 extracted. Further, the high reliance authentication server calculation unit 460 calculates the reliability of each of the authentication server 200. The reliability is calculated with reference to a list of received IdP-ID and the authentication server reliance condition storage unit 510, and is a total number of unit number of the service providing server 100 which is defined as to trust the authentication server 200 uniquely identified by IdP-ID which is included in the list. Further, the high reliance authentication server calculation unit 460 includes a function to send the reliability of each of the calculated authentication server 200 to the authentication server selection unit 440.

The authentication request receiving unit 210 of the authentication server 200 includes a function to receive Proxy-ID and User-ID and a function to send User-ID to the user authentication unit 220.

The user authentication unit 220 of the authentication server 200 includes a function to receive User-ID and display an authentication screen on the terminal 300, a function to receive a password sent from the terminal 300, and a function to check whether it corresponds to the User-ID and matches with the password set in advance.

The terminal 300 includes a function to perform a screen display, a function to accept input, and a function to send inputted User-ID to the service providing unit 110.

Next, operation of the present exemplary embodiment will be described in detail with reference to FIGS. 1-9.

Figure 4:
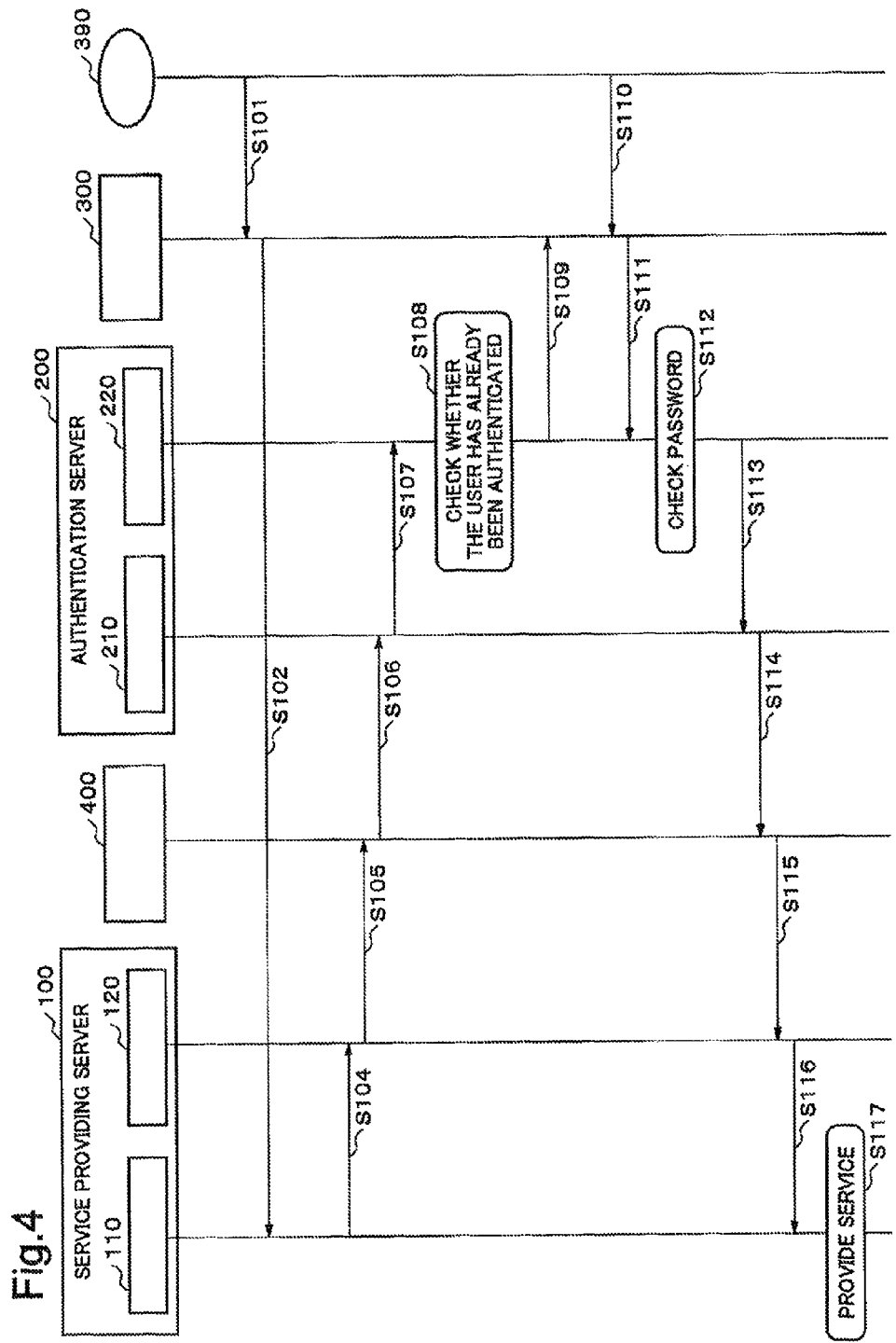
FIG. 4 is a sequence diagram showing an overall operation of the sixth exemplary embodiment of the present invention.
Figure 5:
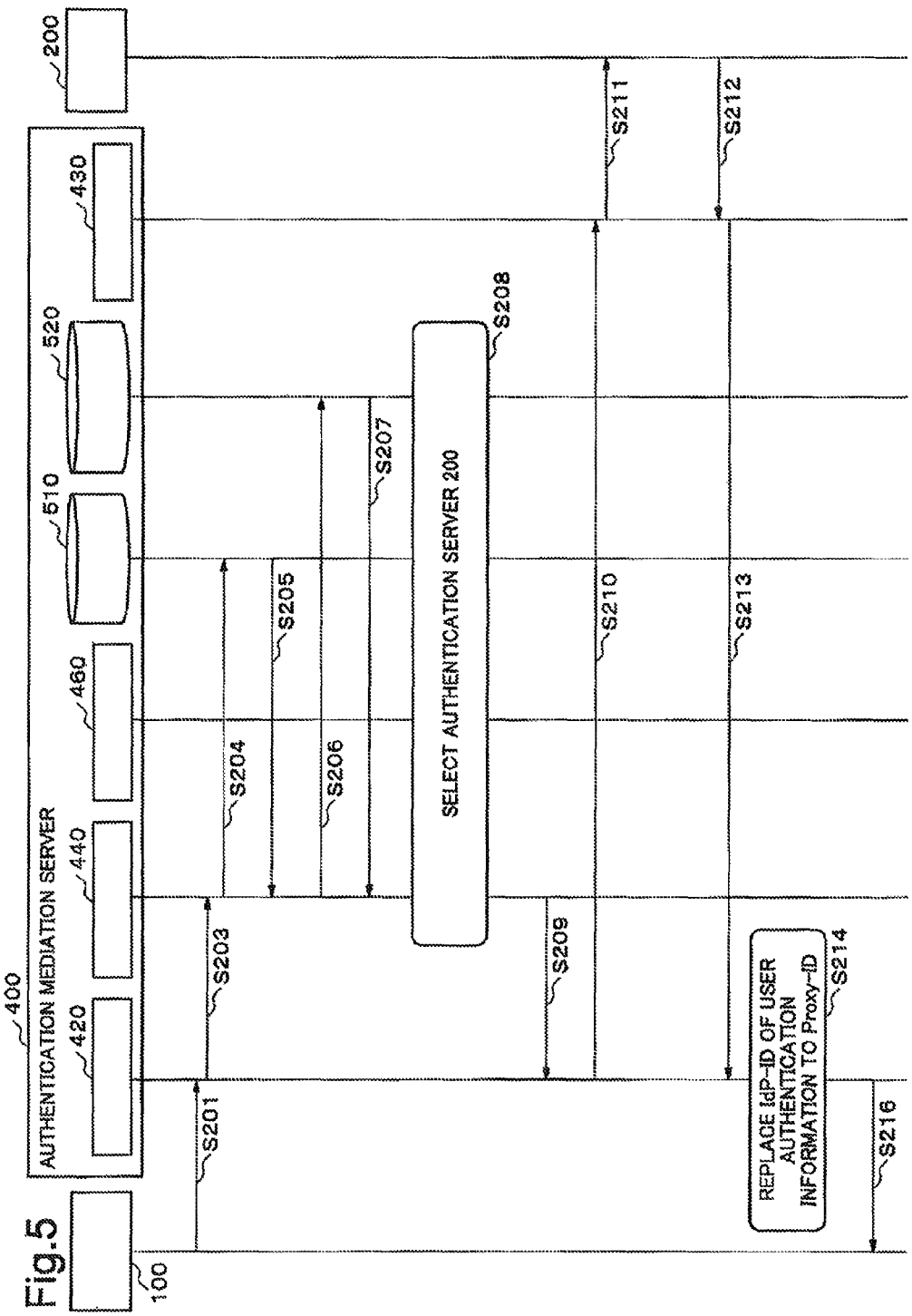
FIG. 5 is a sequence diagram showing an operation of an internal of authentication mediation server of the first to third, the fifth and the sixth exemplary embodiment of the present invention.
Figure 6:
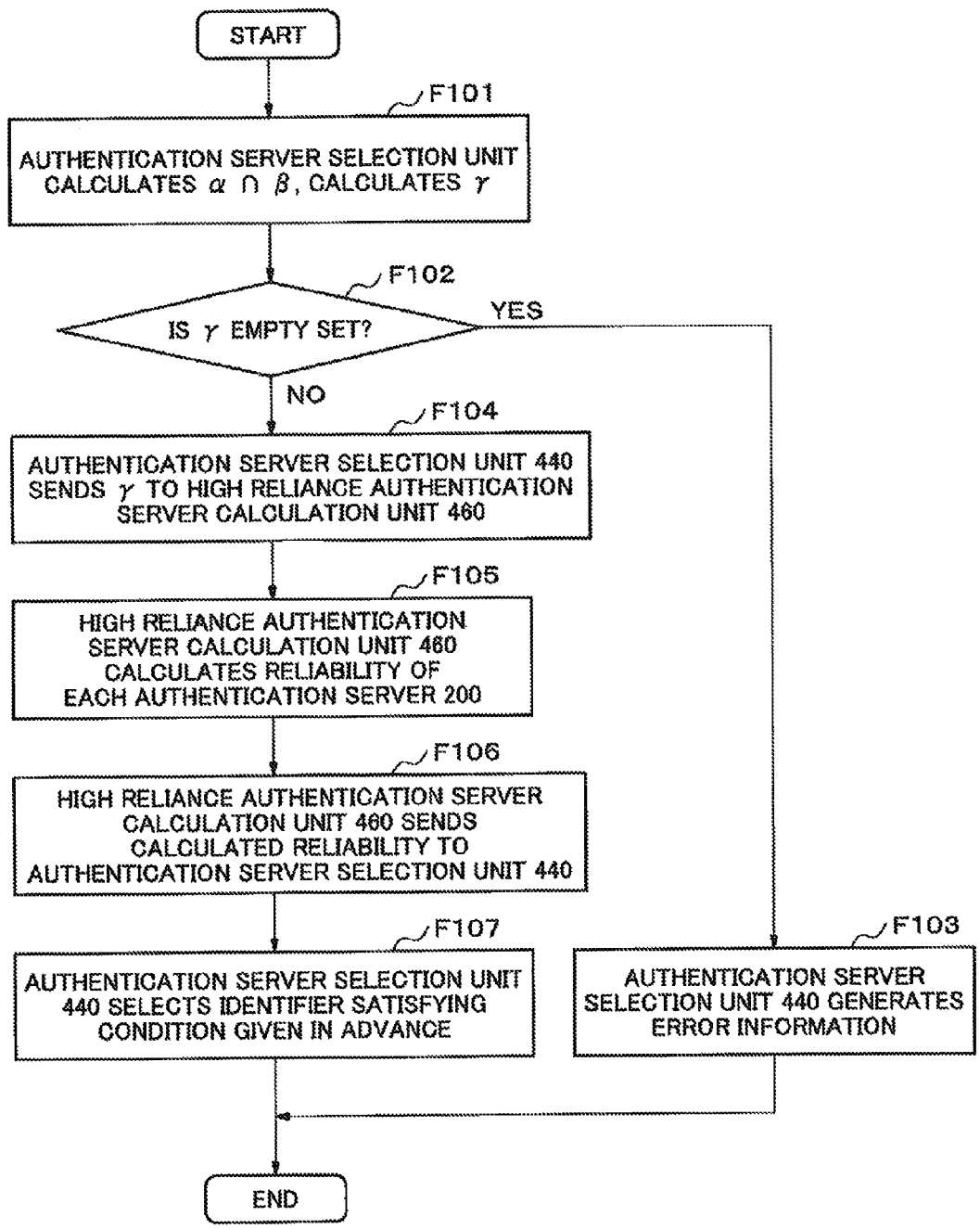
FIG. 6 is a flowchart showing an operation of an internal process of an authentication server selection unit of the first to sixth exemplary embodiment of the present invention.

FIG. 4 is a sequence diagram showing an overall operation of the present exemplary embodiment, FIG. 5 is a sequence diagram showing an operation of the internal of authentication mediation server 400, and FIG. 6 is a flowchart showing an operation of the internal process of authentication server selection unit 440.

Under the assumption that SP-ID of two service providing servers 100 is SP_1 and SP_2 respectively. Further, it is supposed that Proxy-ID of the authentication mediation server 400 is Proxy_1. Further, it is supposed that IdP-ID of three authentication servers 200 is IdP_1, IdP_2 and IdP_3 respectively. Further, it is supposed that two terminals 300 have been as a usage target for the user 390 which the User-ID is Alice and Bob respectively.

Furthermore, it is supposed that in the authentication server reliance condition storage unit 510, as shown in FIG. 2, the authentication server reliance condition information 511 is stored. The authentication server reliance condition information 511 includes the information that defines a service providing server 100 [SP_1] trust an authentication server 200 [IdP_1] and an authentication server 200 [IdP_2]. Further, the authentication server reliance condition information 511 includes the information that defines a service providing server 100 [SP_2] trust the authentication server 200 [IdP_2] and the authentication server 200 [IdP_3]. Further, the notation of "service providing server 100 [SP_1]" represents the service providing server 100 by which SP-ID is SP_1. The same applies to the following. Further, the notation of "authentication server 200 [IdP_1]" represents the authentication server 200 by which IdP-ID is IdP_1. The same applies to the following.

Further, it is supposed that in user usage authentication server storage unit 520, as shown in FIG. 3, the user usage authentication server information 521 is stored. The user usage authentication server information 521 includes information that a user 390 [Alice] includes the authentication server 200 [IdP_1], the authentication server 200 [IdP_2], and an authentication server 200 [IdP_3] as the usage target, and information that a user 390 [Bob] includes the authentication server 200 [IdP_1] and the authentication server 200 [IdP_2] as the usage target.

For example, when in the opportunity of the user 390 [Alice], ("the notation of the user 390 [Alice] represents the user 390 which User-ID is Alice. Hereinafter, the same applies.) inputs User-ID (Alice), SP-ID (SP_1), and Proxy-ID (Proxy_1) to the terminal 300 [Alice] (the notation of "terminal 300 [Alice]" represents the terminal 300 which the user 390 [Alice] is using.), the present exemplary embodiment begins to operate (Step S101).

First, the terminal 300, based on the inputted SP-ID, sends User-ID (Alice) and Proxy-ID (Proxy_1) to the service providing unit 110 of the service providing server 100 [SP_1] and requests to provide service (Step S102).

Next, the service providing unit 110 sends received User-ID (Alice) and Proxy-ID (Proxy_1) to the authentication certificate user authentication unit 120 and requests authentication of the user 390 (Step S104).

Next, the authentication certificate user authentication unit 120, based on the received User-ID (Alice) and Proxy-ID (Proxy_1), sends User-ID (Alice) and the one's SP-ID (SP_1) to the authentication server mediation unit 420 of the authentication mediation server 400 [Proxy_1] and requests to obtain authentication information (Step S105 and Step S201). Further, the notation of "authentication mediation server 400 [Proxy_1]" represents the authentication mediation server 400 by which Proxy-ID is Proxy_1. The same applies to the following.

Next, the authentication server mediation unit 420 sends received User-ID (Alice) and SP-ID (SP_1) to the authentication server selection unit 440 and requests to select the authentication server 200 (Step S203).

Next, the authentication server selection unit 440, based on received SP-ID (SP_1), from the authentication server reliance condition storage unit 510, obtains a list of IdP-ID associated with SP-ID (SP_1) as the reliance condition. The list including IdP-ID obtained hereof is called α, and it is α=(IdP_1, IdP_2) by an example of the present description (Step S204 and Step S205).

Next, the authentication server selection unit 440, based on received User-ID (Alice), from the user usage authentication server storage unit 520, obtains a list of IdP-ID associated with User-ID (Alice). The list including IdP-ID obtained hereof is called β, in the example of the present description β=(IdP_1, IdP_2, IdP_3). (Step S206 and Step S207)

Next, then authentication server selection unit 440 and the high reliance authentication server calculation unit 460, in cooperation, based on the list of IdP-ID of the authentication server 200 defined as trusted from the service providing server 100 (that is, list α), on the list of IdP-ID of the authentication server 200 as a usage target of the user 390 (that is, list β), and on the authentication server reliance condition information 511, selects the authentication server 200 (Step S208).

Here, detailed operation of Step S208 will be described with reference to FIG. 6.

The authentication server selection unit 440 calculates α∩β, that is, (IdP_1, IdP_2)∩(IdP_1, IdP_2, IdP_3), and obtains (IdP_1, IdP_2). A list obtained here is called γ, and it is γ=(IdP_1, IdP_2) in the example of the present description (step F101). γ, in other words, is defined as to be trusted from the service providing server 100 [SP_1], and is a list of authentication servers 200 which the user 390 [Alice] has as the usage target.

Next, the authentication server selection unit 440 checks whether γ is an empty set or not (step F102).

When γ is an empty set (in step F102, YES), the authentication server selection unit 440 generates error information of "the authentication server 200 which the service providing server 100 defined as trusted, and which the user 390 has as the usage target does not exist." (step F103).

When γ is not an empty set (in step F102, NO), the authentication server selection unit 440 sends γ to the high reliance authentication server calculation unit 460. According to the present exemplary embodiment, because it is calculated as γ=(IdP_1, IdP_2), (IdP_1, IdP_2) is sent to the high reliance authentication server calculation unit 460 (step F104).

Next, the high reliance authentication server calculation unit 460 by referring to the authentication server reliance condition storage unit 510, calculates the reliability of each authentication server 200 which is identified uniquely by IdP-ID included in the received list γ. The calculation of the reliability, for example, converts one service providing servers 100 which defined to trust the authentication server 200 into "1" and adds the unit number of all service providing servers 100 which define to trust the authentication server 200 (step F105).

In case of an example of the present description, of γ=(IdP_1, IdP_2), because the authenticate server 200 [IdP_1] is defined as trusted only from the service providing server 100 [SP_1] therefore the reliability is "1", and because the authentication server 200 [IdP_2] is defined as trusted from the service providing server 100 [SP_1] and the service providing server 100 [SP_2] therefore the reliability is calculated as "2".

Next, the high reliance authentication server calculation unit 460 sends the calculated reliability to the authentication server selection unit 440 (step F106).

Next, the authentication server selection unit 440 selects an identifier satisfying the condition (the highest reliability, for example) given in advance. In an example of the present description, of IdP_1 with the reliability of "1" and IdP_2 with the reliability of "2", IdP_2 which satisfies the condition of having the highest reliability is selected (step F107).

The description of Step S208 is concluded.

Next, the authentication server selection unit 440 sends error information which was generated by the selected IdP-ID (IdP_2) or by step F1-3 to the authentication server mediation unit 420 (Step S209).

Next, the authentication server mediation unit 420 sends received IdP-ID (IdP_2) and User-ID (Alice) to the authentication request unit 430 and requests to obtain authentication information (Step S210).

Next, the authentication request unit 430, based on the received IdP-ID (IdP_2) and User-ID (Alice), to the authentication request receiving unit 210 of the authentication server 200 [IdP_2], sends User-ID (Alice) and the own Proxy-ID (Proxy_1) and requests to obtain authentication information (Step S106 and Step S211).

Next, the authentication request receiving unit 210 sends received User-ID (Alice) to the user authentication unit 220 and requests to obtain authentication information of the user 390 (Step S107).

Next, the user authentication unit 220 checks whether the user 390 (Alice) is identified uniquely by the received User-ID (Alice) has been authenticated. When it has already been authenticated, operation of the user authentication unit 220 goes to Step S113. When it has not yet been authenticated, the user authentication unit 220 requests to the terminal 300 which the user 390 [Alice] identified uniquely by User-ID (Alice) uniquely is using, to display an authentication screen. In the example of the present description, by receiving the request the terminal 300 [Alice] displays an authentication screen for an authentication of the user 390 [Alice] (Step S108 and Step S109).

Next, when the user 390 [Alice] inputs the pre-registered password of the user 390 [Alice], the terminal 300 [Alice] sends password information to the user authentication unit 220 (Step S110 and Step S111).

Next, the user authentication unit 220 checks whether the received password information matches with the password information set in advance or not (Step S112). When it does not match, the user authentication unit 220 performs an error handling. Further, because an error handling in such case is a well-known technology, the description will be omitted. When it matches, the user authentication unit 220 authenticates the user 390 [Alice]. Then, the user authentication unit 220 sends an authentication successful notification of the user 390 [Alice] to the authentication request receiving unit 210 (Step S113).

Next, the authentication request receiving unit 210 creates the user authentication information based on the received authentication success notification, and sends the user authentication information to the authentication request unit 430 of the authentication mediation server 400. Further, to the user authentication information, information that the authentication server 200 [IdP_1] authenticated the user 390 [Alice] is included (Step S114 and Step S212).

Next, the authentication request unit 430 of the authentication mediation server 400 sends the received user authentication information to the authentication server mediation unit 420 (Step S213).

Next, the authentication server mediation unit 420 deletes IdP-ID (IdP_1) of the received user authentication information and changes to Proxy-ID (Proxy_1) (Step S214).

Continuously, the authentication server mediation unit 420 sends the user authentication information to the authentication certificate user authentication unit 120 of the service providing server 100 (Step S115 and Step S216).

Next, the authentication certificate user authentication unit 120, based on information that the authentication server mediation unit 420 [Proxy_1] indicated by the received user authentication information authenticated the user 390 [Alice], makes it as the user authentication has been completed. Moreover, the authentication certificate user authentication unit 120 sends a completion notification of user authentication to the service providing unit 110 (Step S116).

Next, the service providing unit 110, based on the reception of a completion notification of user authentication provides service to the user 390 [Alice] (Step S117).

As it has been described above, in the present exemplary embodiment, among the authentication servers 200 as the usage target of the user 390, the authentication server 200 which is defined to be trusted from many service providing servers 100 which are the reliance conditions of the service providing servers 100 is selected preferentially.

For example, according to the example of the above-mentioned description, among the authentication server 200 [IdP_1], the authentication server 200 [IdP_2], and the authentication server 200 [IdP_3] which are the usage target of the user 390 [Alice], based on the reliance condition of the service providing server 100 [SP_1], the authentication server 200 [IdP_2] is selected.

Further, according to the present exemplary embodiment, as an identifier which identifies the user 390 uniquely, in each of the service providing server 100, the authenticate server 200, and the authentication mediation server 400 a different identifier may be used.

For example, the authentication server mediation unit 420 or the authentication request unit 430 may include a function to store user ID cooperation information 501 as shown in FIG. 7 associated Proxy-User-ID with IdP-User-ID, and to convert both identifiers with reference hereto. Further, Proxy-User-ID and IdP-User-ID are an identifier of the user 390 used in the authentication mediation server 400 and an identifier of the user 390 used in the authentication server 200 respectively. The same applies to the following. In this way, in the authentication mediation server 400 and the authenticate server 200 different identifiers can be used.

Figure 8:
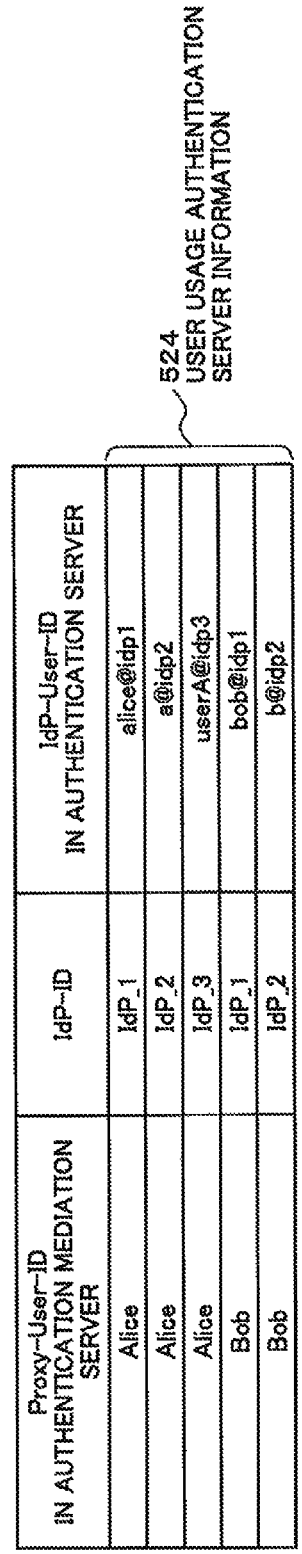
FIG. 8 is a diagram showing a structure of the user usage authentication server information of the first to third exemplary embodiment of the present invention.

In addition, as shown in FIG. 8, the user usage authentication server storage unit 520 stores the user ID cooperation information including in the user usage authentication server information 524, and the authentication server selection unit 440 may convert both identifiers.

Further, for example, the authentication server mediation unit 420 may store the user ID cooperation information 504 as shown in FIG. 9 associated Proxy-User-ID with SP-User-ID, and include a function to and convert both identifiers with reference hereto. Further, SP-User-ID is the identifier of the user 390 used in the service providing server 100. In this way, in the authentication mediation server 400 and the service providing server 100 different identifiers can be used.

The first effect in the present exemplary embodiment mentioned above is a point that it is possible to satisfy both of hiding the authentication server 200 from the service providing server 100 and selecting the authentication server 200 which reflected the condition that a service providing server 100 requires.

The reason is because, it is made to select an authentication server 200 which satisfies the reliance condition of the service providing server 100, among the authentication server 200.

Accordingly, because the service providing server 100 is possible to reflect the judgmental standard of the service providing server 100 to the judgmental standard of the authentication mediation server 400, it becomes easier to use an authentication system using the authentication mediation server 400.

The reason for this is that, first, when a large number of companies are to manage the authentication server 200, a possibility of the existence of an unreliable authentication server 200 occurs. In the selection of the authentication server 200 under such situation, to follow only the judgmental standard of the authentication mediation server by trusting the authentication mediation server completely, there may be a risk of selecting an unreliable authentication server 200. In contrast, according to the present exemplary embodiment, it is possible to reflect the reliance condition of the service providing server 100 side as a judgmental standard of the authentication server selection in the authentication mediation server 400. Accordingly, because the operator of service providing server 100 will be capable of avoiding the above mentioned risk.

The second effect in the present exemplary embodiment mentioned above is a point that it is possible to reduce an operational burden which user select the authentication server 200 which can accept the user itself and the service providing server 100 among a plurality of authentication servers 200.

The reason is similar, it is because the authentication server 200 which satisfies the reliance condition of the service providing server 100 is made to be selected, among the authentication servers 200.

The Second Exemplary Embodiment

Next, a second exemplary embodiment of the present invention will be described in detail with reference to the drawings. The structure of the second exemplary embodiment of the present invention, compared with the first exemplary embodiment, the structure of the authentication server reliance condition stored in an authentication server reliance condition storage unit 510 is different. In addition, the operation of the second exemplary embodiment of the present invention, compared with the operation of the first exemplary embodiment, the operation of a high reliance authentication server calculation unit 460 in step F105 of FIG. 6 is different.

Figure 10:
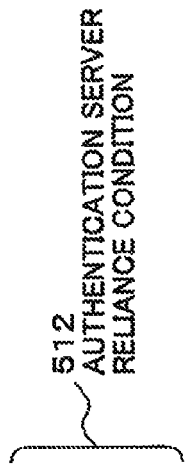
FIG. 10 is a diagram showing a structure of the authentication server reliance condition information on the second and third exemplary embodiment of the present invention.

FIG. 10 is a diagram showing a structure of an authentication server reliance condition information 512 stored in the authentication server reliance condition storage unit 510 of the present exemplary embodiment. The authentication server reliance condition information 512 of the present exemplary embodiment is information which associated SP-ID and IdP-ID which uniquely identifies an authentication server 200 that is defined as to be trusted from a service providing server 100 which is uniquely identified by the SP-ID with an individual reliability of the authentication server 200. The individual reliability of the authentication server 200 is the degree of by which the respective service providing servers 100 set in advance in the respective service providing servers 100 trust the respective authentication servers 200.

The calculation of the reliability in step F105 of FIG. 6 in the present exemplary embodiment, for example, estimates the individual reliability to each authentication server 200 of each service providing server 100.

In the case of an example of the present description, it is calculated as the reliability of an authentication server 200 [IdP_1] is "16", and the reliability of an authentication server 200 [IdP_2] is "12 (8+4=12)". Accordingly, in the subsequent processing, the authentication server 200 [IdP_1] is selected.

The effect in the present exemplary embodiment mentioned above, in addition to the effect of the first exemplary embodiment, is a point that the authentication server 200 which reflected more precisely of the condition that the service providing server 100 requires can be selected.

The reason is because the reliability of the authentication server 200 has been made to calculate based on the individual reliability of each authentication server 200 set in the respective service providing servers 100.

The Third Exemplary Embodiment

Next, the third exemplary embodiment of the present invention will be described in detail with reference to the drawings. The composition of the third exemplary embodiment of the present invention is the same as the composition of the second exemplary embodiment. Further, the operation of the third exemplary embodiment of the present invention, compared with the operation of the second exemplary embodiment, the operation of a high reliance authentication server calculation unit 460 in step F105 of FIG. 6 is different The calculation of the reliability in step F105 in FIG. 6 of the present exemplary embodiment, for example, normalizes the individual reliability as the average value of the individual reliability of each service providing server 100 will be the identical value, and estimates the normalized individual reliability of the respective service providing server 100 to each authentication server 200.

In case of an example of the present description, in order to have the average value "12" of the individual reliability of a service providing server 100 [SP_1] and the average value "4" of the individual reliability of a service providing server 100200 [SP_2] in the identical value, for example "12", the individual reliability of an authentication server 200 [IdP_2] of a service providing server 100200 [SP_2] is normalized to "12". Similarly, the individual reliability of an authentication server 200 [IdP_3] is normalized to "12" likewise. Then, it is calculated as the reliability of an authentication server 200 [IdP_1] is "16", and the reliability of the authentication server 200 [IdP_2] is "20 (8+4×3=20)". Accordingly, in the subsequent processing, the authentication server 200 [IdP_2] is selected.

The effect in the present exemplary embodiment mentioned above, in addition to the effect of the second exemplary embodiment, is to be able to absorb variation between the service providing servers 100 about the condition that is reflected to the selection of the authentication server 200.

The reason is because the individual reliability of each respective authentication servers 200 by which the service providing server 100 set is made to normalize based on the average value of each service providing server 100.

The Fourth Exemplary Embodiment

Figure 11:
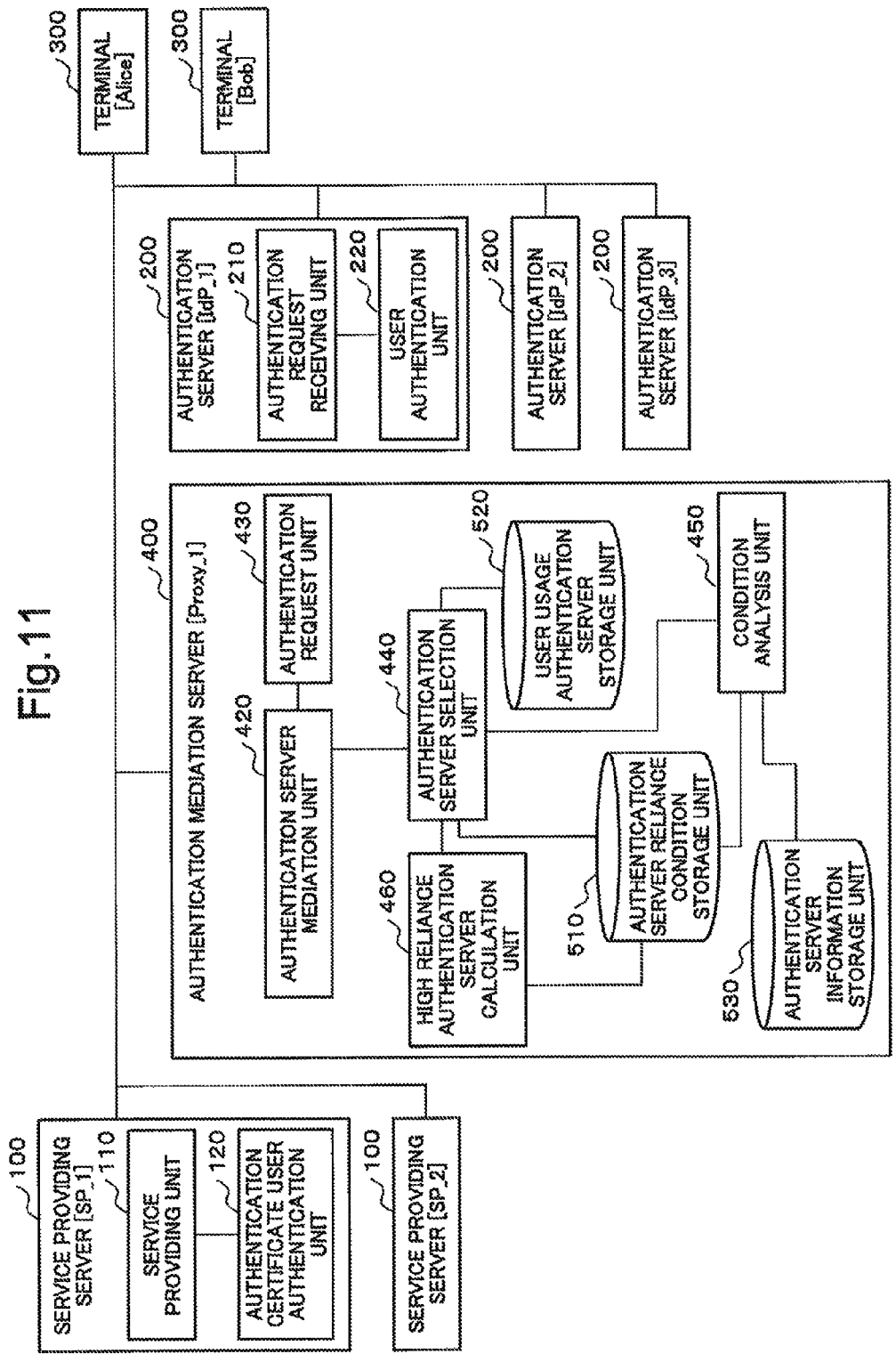
FIG. 11 is a block diagram showing a composition of the fourth exemplary embodiment of the present invention.

Next, the fourth exemplary embodiment of the present invention will be described in detail with reference to the drawings. FIG. 11 is a block diagram showing a composition of the present exemplary embodiment.

The composition of the fourth exemplary embodiment of the present invention, compared with the composition of the first exemplary embodiment, the structure of the authentication server reliance condition information stored in an authentication server reliance condition storage unit 510 and the function of an authentication server selection unit 440 are different. Furthermore, a condition analysis unit 450 and an authentication server information storage unit 530 are added to an authentication mediation server 400.

FIG. 12 is a diagram showing a structure of authentication server reliance condition information 514 stored in the authentication server reliance condition information storage unit 510 of the present exemplary embodiment. The authentication server reliance condition information 514 of the present exemplary embodiment is information associated SP-ID and IdP-ID which uniquely identifies an authentication server 200 that is defined as to be trusted from a service providing server 100 which is uniquely identified by SP-ID with characteristics condition information which is characteristics information of the authentication server 200 that is defined as the service providing server 100 which is uniquely identified by SP-ID satisfies.

Further, in the IdP-ID of the diagram, ",", hs, is a delimiter for separating a plurality of IdP-ID.

The authentication server selection unit 440 of the authentication mediation server 400 of the present exemplary embodiment, in addition to the function that the authentication server selection unit 440 of the authentication mediation server 400 of the first exemplary embodiment includes, includes a function to send the authentication server reliance condition information 514 obtained from the authentication server reliance condition storage unit 510 to a condition analysis unit 450. Furthermore, the authentication server selection unit 440 includes a function to receive the condition reflected IdP-ID list from the condition analysis unit 450.

An authentication server information storage unit 530 includes a function to store an authentication server information 531 as shown in FIG. 13 associated IdP-ID with characteristics information on the authentication server 200 uniquely identified by the IdP-ID. Further, the authentication server information storage unit 530 for example, may be a database system which returns corresponding information (list of characteristics information, for example) associated with the presented condition information (list of IdP-ID, for example).

The condition analysis unit 450 includes a function to receive the authentication server reliance condition information 514 from the authentication server selection unit 440. Further, the condition analysis unit 450 includes a function to obtain characteristics information on the authentication server 200 associated with SP-ID included in the authentication server reliance condition information 514 from the authentication server information storage unit 530. Further, the condition analysis unit 450 includes a function to generate the condition reflected IdP-ID list which reflected and extracted characteristics information on the authentication server 200, based on the obtained characteristics information and the received authentication server reliance condition information 514. Further, the condition analysis unit 450 includes a function to send the condition reflected IdP-ID list to the authentication server selection unit 440.

Figure 14:
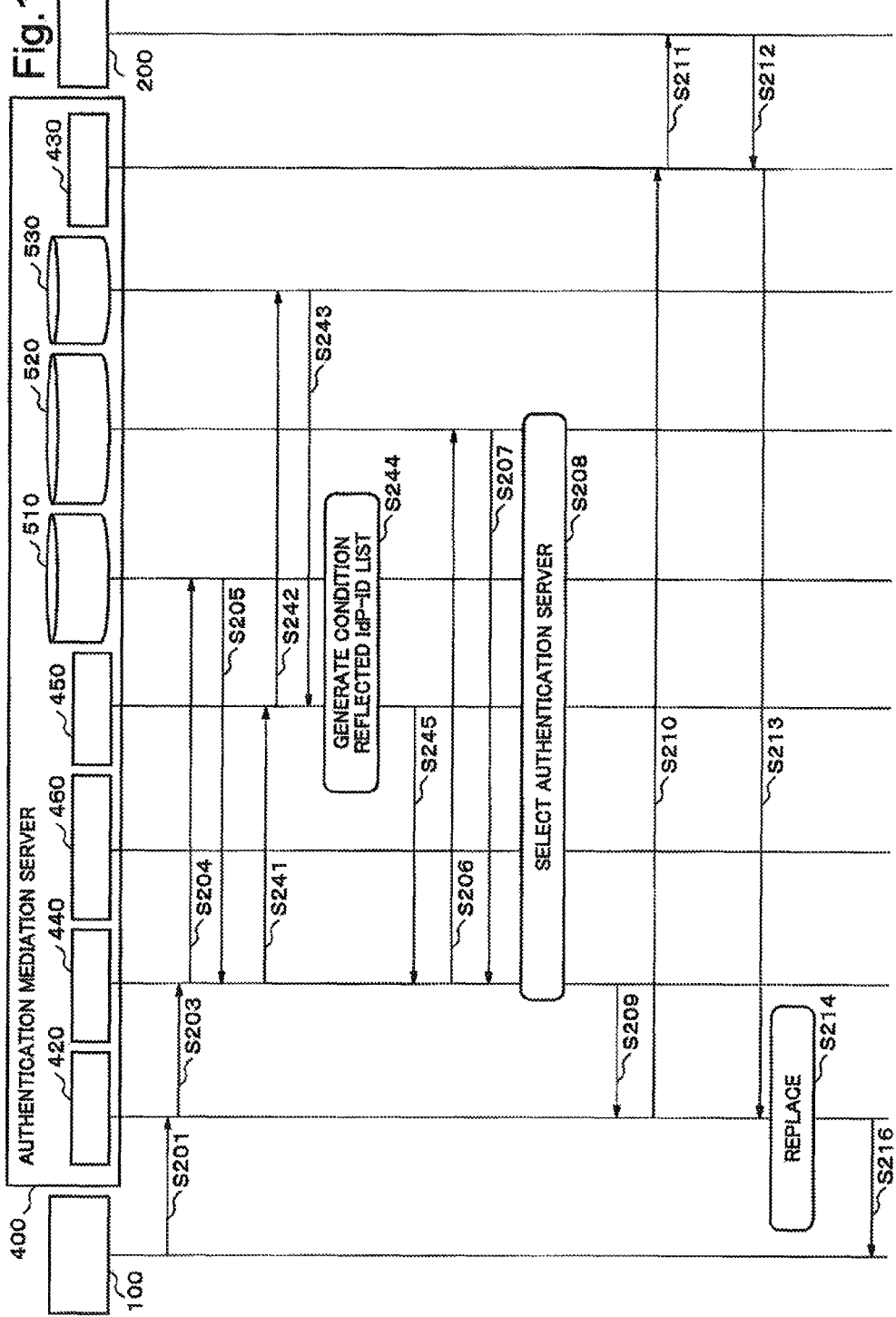
FIG. 14 is a sequence diagram showing an operation of an internal of the authentication mediation server of the fourth exemplary embodiment of the present invention.

Next, operation of the present exemplary embodiment will be described in detail with reference to FIGS. 1-14. FIG. 14 is a sequence diagram showing an operation of an internal of the authentication mediation server 400 of the present exemplary embodiment. The operation of the fourth exemplary embodiment of the present invention, compared with the operation of the first exemplary embodiment, the point that the operation of the authentication server selection unit 440 and the authentication server reliance condition storage unit 510 in sequence of Step S205 of FIG. 5 has changed is different. Furthermore, the operation of the fourth exemplary embodiment of the present invention, compared with the operation of the first exemplary embodiment, sequence of Steps S241-S245 is added, and the point that the operation of the authentication server selection unit 440 in sequence of Step S208 has changed is different.

Further, in addition to the assumption of the description of the operation of the first exemplary embodiment, it is supposed that the authentication server reliance condition storage unit 510 stores the authentication server reliance condition information 514 as shown in FIG. 12. Further, it is supposed that the authentication server information storage unit 530 stores authentication server information 531 as shown in FIG. 13.

The authentication server selection unit 440, based on received SP-ID (SP_1), from the authentication server reliance condition storage unit 510, obtains a list of IdP-ID associated with SP-ID (SP_1) as the reliance condition and characteristics condition information. In an example of the present description, the list α=(IdP_1, IdP_2) of IdP-ID and the characteristics condition information (PKI authentication and IdP with the authentication method using the one-time password) are obtained (Step S204 and Step S205).

Next, the authentication server selection unit 440 requests to obtain the condition reflected. IdP-ID list by sending the obtained IdP-ID list and characteristics condition information to the condition analysis unit 450 (Step S241).

Next, the condition analysis unit 450, based on the received list α=(IdP_1, IdP_2) of IdP-ID, obtains corresponding received characteristics information from the authentication server information storage unit 530 (Step S242 and Step S243). Further, characteristics information is information such as an authentication method using a one-time password and an authentication method using PKI. The same applies to the following.

Next, the condition analysis unit 450 extracts IdP-ID (IdP_, IdP_2) which corresponding characteristics information matches with the characteristics condition information and makes it as a condition reflected IdP-ID list (IdP_1, IdP_2) (Step S244). Further, the characteristics condition information is the information for using authentication method or the like which IdP uses PKI authentication and one-time password.

Continuously, the condition analysis unit 450 sends the condition reflected IdP-ID list (IdP_1, IdP_2) to the authentication server selection unit 440 (Step S245).

In Step S208, the authentication server selection unit 440 and the high reliance authentication server calculation unit 460, in cooperation, instead of list α select the authentication server 200 based on the condition reflected IdP-ID list, list β, and the authentication server reliance condition information 514 (Step S208).

Further, the authentication server reliance condition 514 may have a configuration not including IdP-ID. In this case, the operation after Step S204 will be as follows.

The authentication server selection unit 440, based on received SP-ID (SP_1), from the authentication server reliance condition storage unit 510, obtains characteristics condition information associated with SP-ID (SP_1) as the reliance condition. In an example of the present description, the characteristics condition information (PKI authentication and IdP with the authentication method using the one-time password) is obtained (Step S204 and Step S205).

Next, the authentication server selection unit 440 requests to obtain the condition reflected IdP-ID list which reflected the characteristics condition by sending obtained characteristics condition information to the condition analysis unit 450 (Step S241).

Next, the condition analysis unit 450, based on received list α=(IdP_1, IdP_2) of IdP-ID, obtains corresponding characteristics information (authentication method using one-time password and authentication method using PKI) from the authentication server information storage unit 530 (Step S242 and Step S243).

Next, the condition analysis unit 450 extracts IdP-ID (IdP_1, IdP_2) which matches with the corresponding characteristics condition information and makes it as a condition reflected IdP-ID list (IdP_1, IdP_2) (Step S244).

Continuously, the condition analysis unit 450 sends the condition reflected IdP-ID list (IdP_1, IdP_2) to the authentication server selection unit 440 (Step S245).

In Step S208, the authentication server selection unit 440 and the high reliance authentication server calculation unit 460, in cooperation, select the authentication server 200 based on the condition reflected IdP-ID list instead of list α, list β and the authentication server reliance condition information 514 (Step S208).

The first effect in the present exemplary embodiment mentioned above, in addition to the effect of the first exemplary embodiment, is a point that the authentication server 200 including the characteristics that the service providing server 100 requires can be selected.

The reason is because the authentication server 200 used from the authentication servers 200 including the characteristics that matches with the characteristics defined for each service providing server 100 is made to be selected.

The Fifth Exemplary Embodiment

Next, the fifth exemplary embodiment of the present invention will be described in detail with reference to the drawings.

Figure 15:
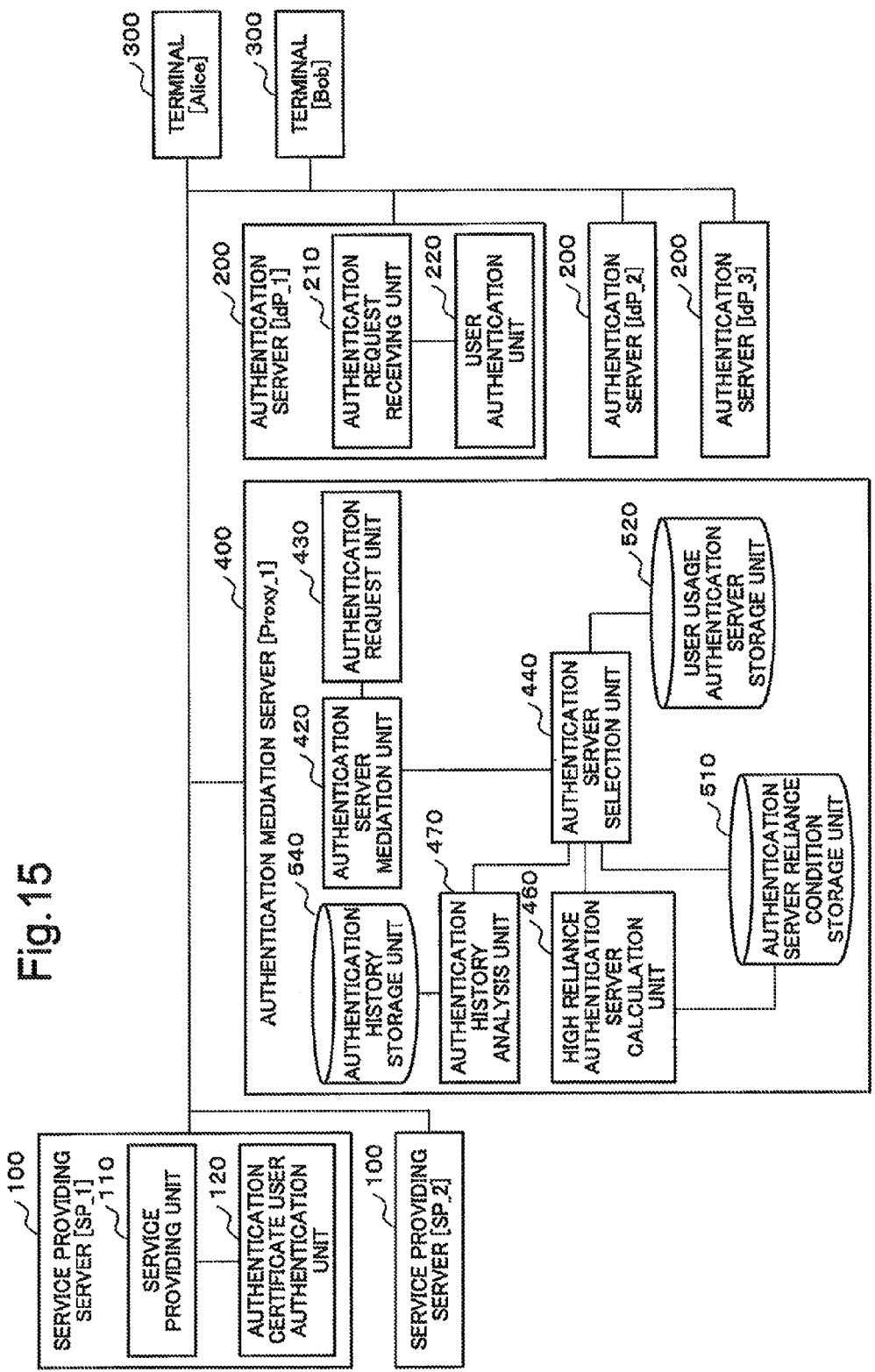
FIG. 15 is a block diagram showing a composition of the fifth exemplary embodiment of the present invention.

FIG. 15 is a block diagram showing a composition of the present exemplary embodiment.

The composition of the fifth exemplary embodiment of the present invention, compared with the composition of the first exemplary embodiment, is different in the function of an authentication server mediation unit 420 and the function of an authentication server selection unit 440, and further an authentication history analysis unit 470 and an authentication history storage unit 540 are added to an authentication mediation server 400.

FIG. 16 is a diagram showing a structure of an authentication history information (also called as history information) 541 stored in an authentication history storage unit 540. The authentication history information 541 is information which associated a User-ID of a user 390 that sent authentication information and SP-ID of the service providing server 100 as the destination with the transmission time.

The authentication server mediation unit 420 of the present exemplary embodiment, in addition to the function that the authentication server mediation unit 420 of the authentication mediation server 400 of the first exemplary embodiment includes, includes a function to store the history of the authentication which mediated to the authentication history storage unit 540 as an authentication history information 541.

The authentication server selection unit 440 of the authentication mediation server 400 of the present exemplary embodiment, in addition to the function that the authentication server selection unit 440 of the first exemplary embodiment includes, includes a function to send SP-ID to the authentication history analysis unit 470 and a function to receive SP-ID extracted as the analysis result of the authentication history.

The authentication history analysis unit 470 includes a function to receive SP-ID from the authentication server selection unit 440. Further, the authentication history analysis unit 470 includes a function, by referring to the authentication history storage unit 540, to analyzes the authentication history of the service providing server 100 which is concerned with the received SP-ID, and includes a function to extract the service providing server 100 of a high probability that the user 390 using a certain service providing server 100 will use next. Further, a function to send SP-ID of the extracted service providing server 100 to the authentication server selection unit 440.

Next, an operation of the present exemplary embodiment will be described in detail with reference to FIGS. 15-16. The operation of the present exemplary embodiment, compared with operation of the first exemplary embodiment, is different in that the operation of the authentication server selection unit 440 in the step of step F106 of FIG. 6 is changed, and the operation of the authentication history analysis unit 470 is added.

Further, in addition to the assumption of the description of operation of the first exemplary embodiment, it is supposed that the authentication history information 541 shown in FIG. 16 is stored in the authentication history storage unit 540 by a precedent operation of the authentication server mediation unit 420.

Figure 17:
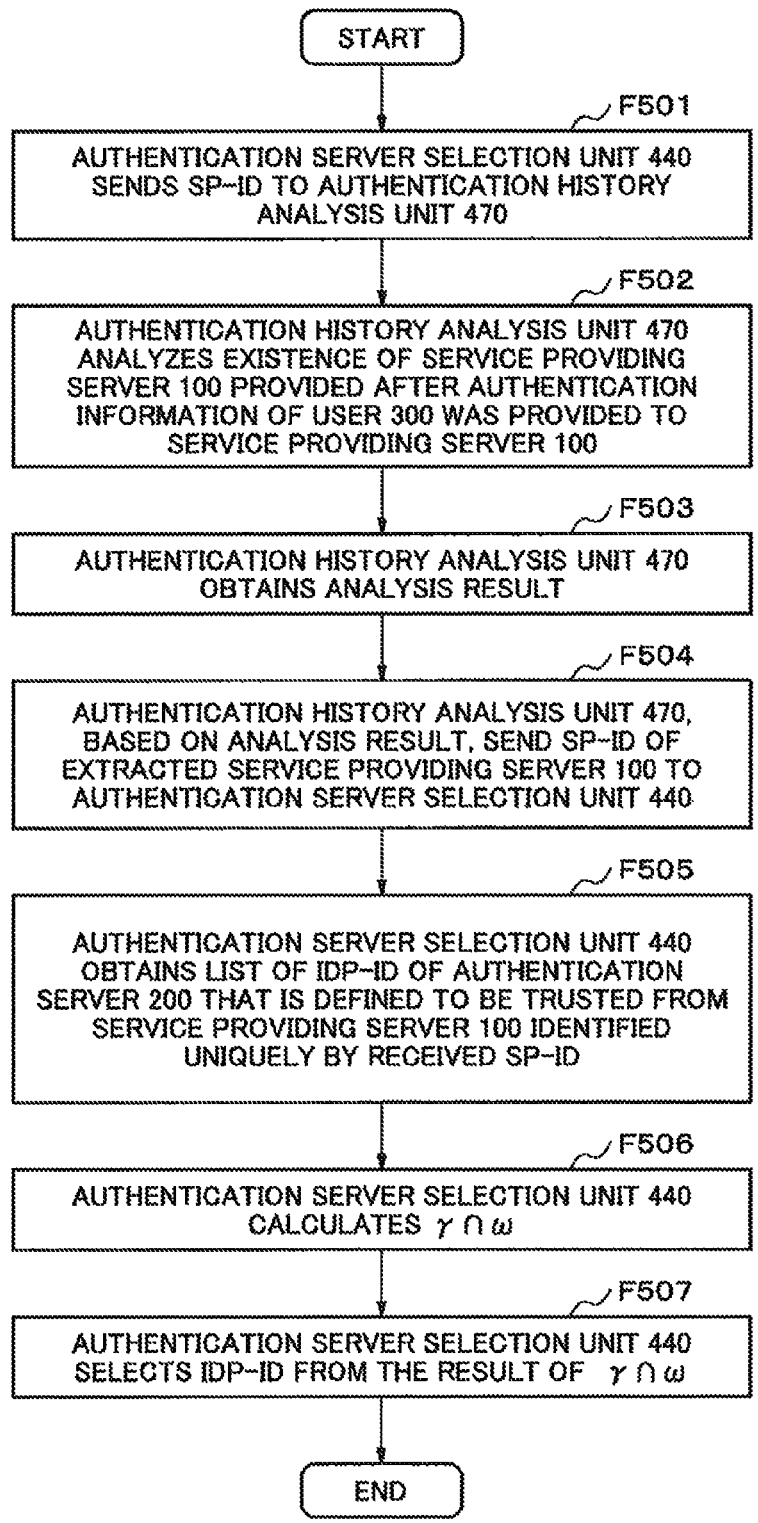
FIG. 17 is a flowchart showing a detailed operation of an internal process of the authentication server selection unit of the fifth exemplary embodiment of the present invention.

Details of operation of step F106 of FIG. 6 in the present exemplary embodiment will be described using a flowchart shown in FIG. 17.

First, the authentication server selection unit 440 sends received SP-ID (SP_1) to the authentication history analysis unit 470 and requests to analyze the authentication history (Step F501).

Next, the authentication history analysis unit 470, based on received SP-ID (SP_1), by referring to the authentication history storage unit 540, analyzes the existence of the continuously provided service providing server 100 after providing the authentication information of the user 300 identified uniquely by the same User-ID to the service providing server 100 which is uniquely identified by the SP-ID (Step F502).

In an example of the present exemplary embodiment, after providing authentication information on a user 390 [Claire] and a user 390 [Dave] to a service providing server 100 [SP_1], providing as well as to a service providing server 100 [SP_2] after 10 minutes is analyzed.

Continuously, the authentication history analysis unit 470, when providing the user authentication information to the service providing server 100 [SP_1], obtains the analysis result that the user authentication information is often provided as well as to the service providing server 100 [SP_2] (Step F503).

Continuously, the authentication history analysis unit 470 sends SP-TD (SP_2) of the service providing server 100 which is extracted based on the analysis result to the authentication server selection unit 440 (Step F504).

Next, the authentication server selection unit 440, based on received SP-ID (SP_2), by referring to the authentication server reliance condition storage unit 510, obtains a list of IdP-ID of the authentication server 200 that is defined to be trusted from the service providing server 100 identified uniquely by the SP-ID (Step F505). The list including IdP-ID obtained hereof is called ω, and it is ω=(IdP_2, IdP_3) in the example of the present description.

Continuously, the authentication server selection unit 440 calculates γ∩ω, that is, (IdP_1, IdP_2)∩(IdP_2, IdP_3) and calculates (IdP_2) (Step F506). The γ∩ω will be a list of the authentication server 200 which is defined as to be trusted from the service providing server 100 [SP_1], and has been as the usage target by the user 390 [Alice], and is defined to be trusted from the service providing server 100 [SP_2] with a high possibility that the user 390 [Alice] will have as the next usage target.

Continuously, the authentication server selection unit 440 selects one IdP-ID from γ∩ω at random. In the example of the present description, because (IdP_2) is the only one γ∩ω, IdP-ID (IdP_2) is selected (Step F507).

The effect in the present exemplary embodiment mentioned above is a point that it may be able to reduce trouble of the user's password input. This is because in the selection of the authentication server 200, with reference to authentication history information 541, it is made to reflect by being defined to be trusted from the service providing server 100 with a high possibility that the user will have as the next usage target in the next as a condition.

That is, when the authentication server selection unit 440 searches one authentication server 200 from a plurality of authentication servers 200, the authentication server 200 to be trusted from the service providing server 100 with a high possibility of being used next is selected.

As a result, for example, when the user 390 uses the service providing server 100 [SP_2] after the service providing server 100 [SP_1], the user 390 has already logged in to the authentication server 200 [IdP_2] that is trusted from the service providing server 100 [SP_2]. For this reason, a trouble for the user 390 to newly input a password or the like to the authentication server 200 [IdP_2] becomes unnecessary.

The Sixth Exemplary Embodiment

Figure 18:
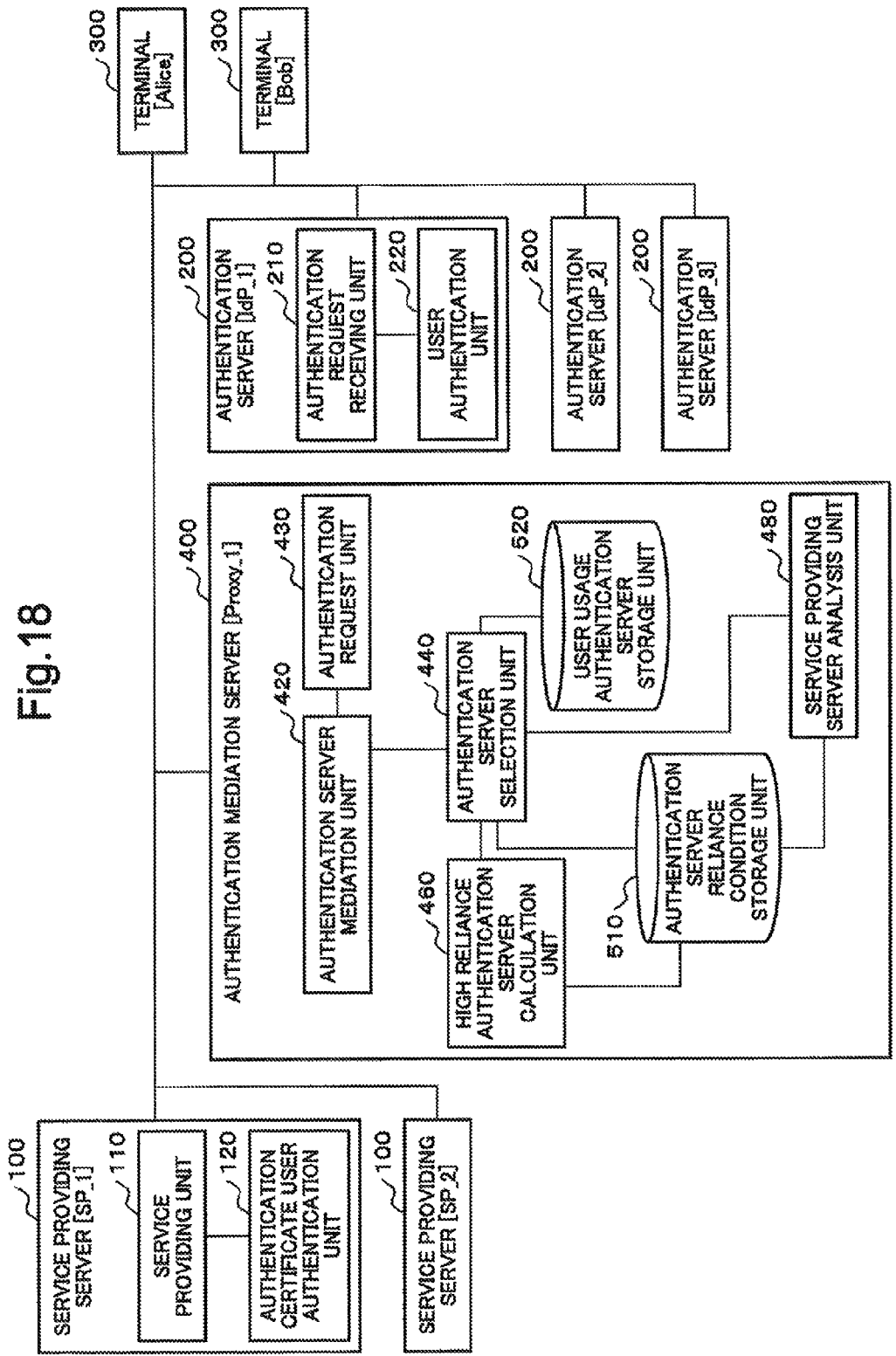
FIG. 18 is a block diagram showing a composition of the sixth exemplary embodiment of the present invention.

Next, the sixth exemplary embodiment of the present invention will be described in detail with reference to the drawings. FIG. 18 is a block diagram showing a composition of the present exemplary embodiment.

The composition of the sixth exemplary embodiment of the present invention compared with the composition of the first exemplary embodiment, is different in the function of an authentication server selection unit 440, and further a service providing server analysis unit 480 is added to an authentication mediation server 400.

The authentication server selection unit 440 of the authentication mediation server 400 of the present exemplary embodiment, in addition to the function that the authentication server selection unit 440 of the first exemplary embodiment includes, include a function to send SP-ID to a service providing server analysis unit 480 and a function to receive SP-ID extracted as the analysis result of a service providing server 100.

The service providing server analysis unit 480 includes a function to receive SP-ID from the authentication server selection unit 440.

Further, the service providing server analysis unit 480 includes a function to extract the service providing server 100 with a high probability that the user 390 using a service providing server 100 will use next, by obtaining the homepage information which the service providing server 100 identified uniquely by received SP-ID provides by analyzing the relation between the service providing servers 100 based on a link to another service providing server 100 existing in a homepage information. Further, the service providing server analysis unit 480 includes a function to send SP-ID of the extracted service providing server 100 to the authentication server selection unit 440.

Next, an operation of the present exemplary embodiment will be described in detail with reference to FIG. 18. The operation of the present exemplary embodiment, compared with operation of the first exemplary embodiment, is different in that the operation of the authentication server selection unit 440 in the step of step F106 of FIG. 6 is changed and that operation of the service providing server analysis unit 480 is added.

Figure 19:
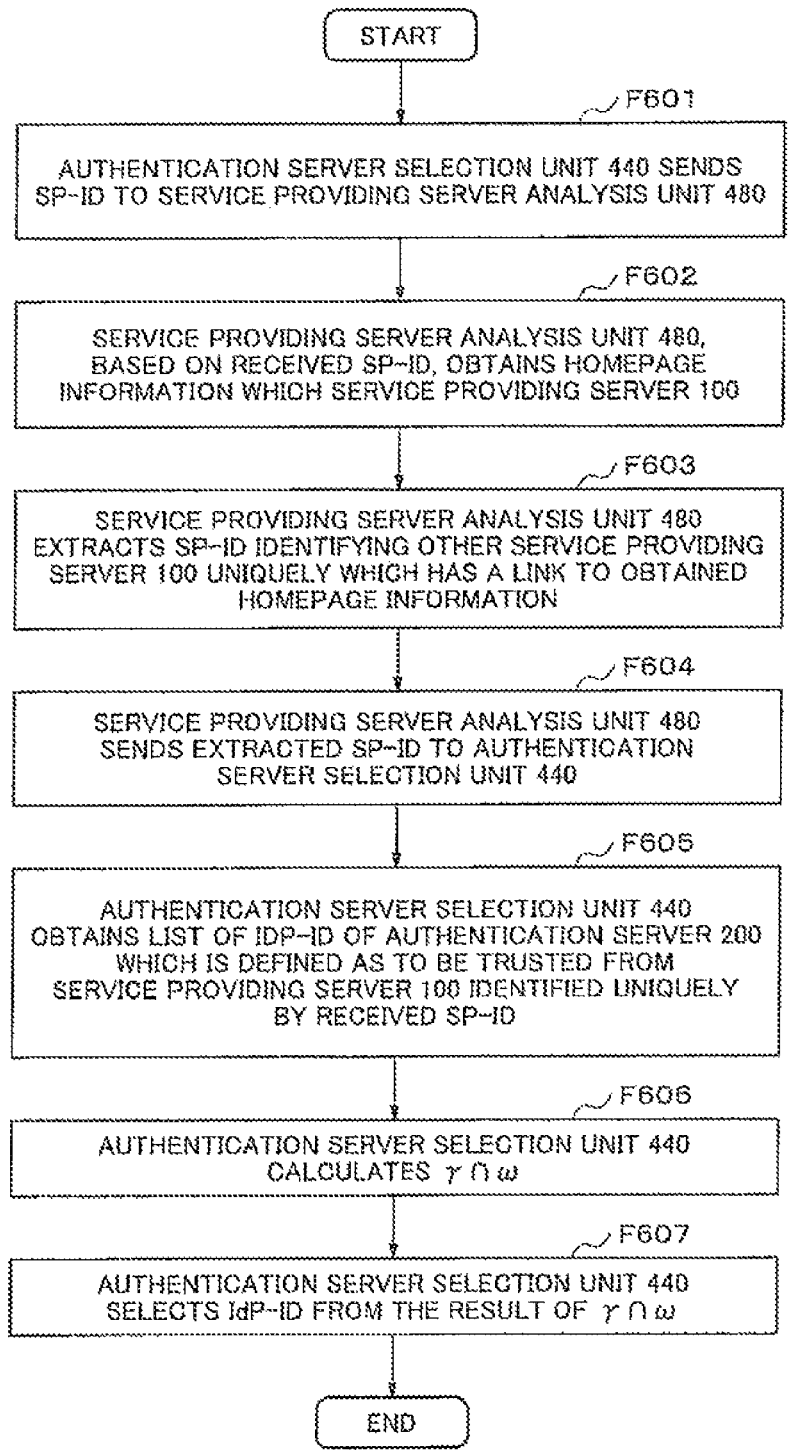
FIG. 19 is a flowchart showing a detailed operation of an internal process of the authentication server selection unit of the sixth exemplary embodiment of the present invention.

Details of operation of step F106 of FIG. 6 in the present exemplary embodiment will be described using a flowchart shown in FIG. 19.

First, the authentication server selection unit 440 sends received SP-ID (SP_1) to the service providing server analysis unit 480 and requests to analyze the service providing server 100 (Step F601).

Next, the service providing server analysis unit 480, based on the received SP-ID (SP_1), obtains homepage information which the service providing server 100 provides (Step F602).

Continuously, the service providing server analysis unit 480 analyzes the existence of a link to other service providing server 100 about obtained homepage information, and extracts SP-ID which uniquely identifies other service providing server 100 in which a link exists (Step F603).

In the present embodiment, for example, it is supposed that a link to the service providing server 100 [SP_2] exists in homepage information of the service providing server 100 [SP_1]. In the case, it judges that the service providing server 100 [SP_1] is related to the service providing server 100 [SP_2], and extracts SP-ID (SP_2).

Continuously, the service providing server analysis unit 480 sends SP-ID (SP_2) of the extracted service providing server 100 to the authentication server selection unit 440 (Step F604).

Next, the authentication server selection unit 440, based on received SP-ID, by referring to an authentication server reliance condition storage unit 510, obtains a list of IdP-ID of the defined authentication server 200 that is defined as to be trusted from the service providing server 100 identified uniquely by the SP-ID (Step F605). The list including IdP-ID obtained hereof is called ω, and it is ω=(IdP_2, IdP_3) by the example of the present description.

Continuously, the authentication server selection unit 440 calculates γ∩ω, that is, (IdP_1, IdP_2)∩(IdP_2, IdP_3) and calculates (IdP_2) (Step F606). The γ∩ω will be a list of the authentication server 200 which is defined as to be trusted from the service providing server 100 [SP_1], and has been as the usage target by the user 390 [Alice], and is defined as to be trusted from the service providing server 100 [SP_2] with the high relation with the service providing server 100 [SP_1].

Continuously, the authentication server selection unit 440 selects one authentication server 200 from γ∩ω at random (Step F607). In the example of the present description, because (IdP_2) is the only γ∩ω, IdP-ID (IdP_2) is selected.

The effect in the present exemplary embodiment mentioned above is a point that it may be able to reduce trouble of the user's password input or the like.

This is because, in the selection of the authentication server 200, with reference to homepage information of the service providing server 100 it is made to reflect by being defined as to be trusted from the service providing server 100 with a high possibility of relation as a condition.

That is, the authentication server selection unit 440, when one authentication server 200 is searched from a plurality of authentication servers 200, finds a service providing server 100 with a relation by firstly analyzing a link relation in homepage information of the service providing server 100 of authentication request source. Continuously, the authentication server selection unit 440 judges that the found service providing server 100 is very likely to be used next by the user 390, and selected the authentication server 200 that is defined to be trusted from the found service providing server 100.

As a result, for example, when the user 390 uses the service providing server 100 [SP_2] after the service providing server 100 [SP_1], the user 390 has already logged in to the authentication server 200 [IdP_2] that is trusted from the service providing server 100 [SP_2]. For this reason, a trouble for the user 390 to newly input a password or the like to the authentication server 200 [IdP_2] becomes unnecessary.

The Seventh Exemplary Embodiment

Figure 20:
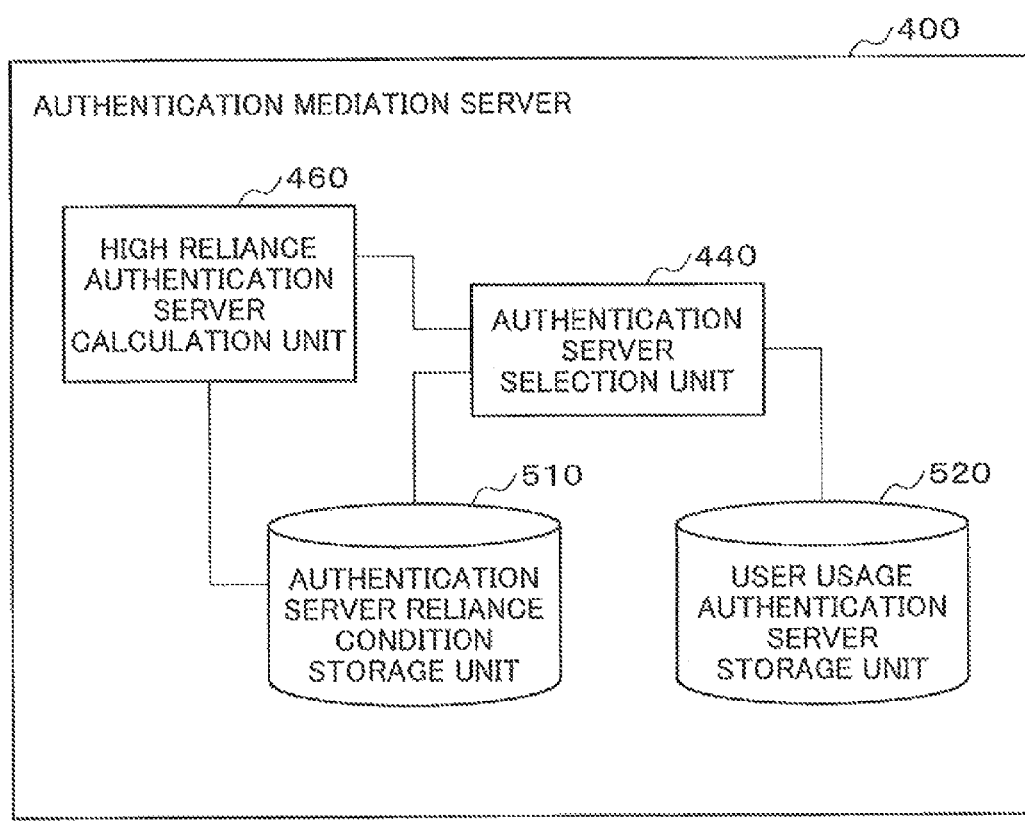
FIG. 20 is a block diagram showing a composition of the seventh exemplary embodiment of the present invention.
Figure 21:
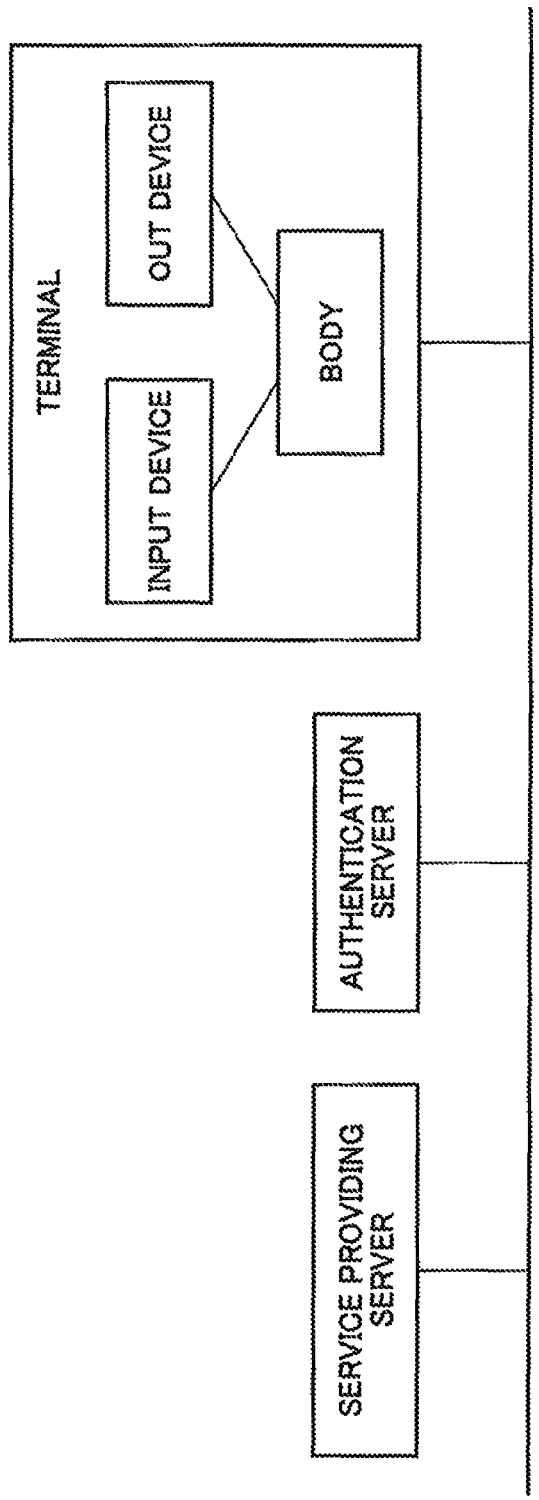
FIG. 21 is a configuration diagram of a system using the authentication server of the background art.

Next, a seventh exemplary embodiment of the present invention will be described in detail with reference to the drawings. FIG. 20 is a block diagram showing a composition of the present exemplary embodiment.

An authentication mediation server 400 according to the seventh exemplary embodiment of the present invention includes the basic parts of the present invention.

Referring to FIG. 20, the authentication mediation server 400 of the present exemplary embodiment includes a high reliance authentication server calculation unit 460, an authentication server selection unit 440, an authentication server reliance condition storage unit 510, and a user usage authentication server storage unit 520.

The authentication server reliance condition storage unit 510 stores a first identifier to specify a service providing server (not shown) and associated the reliance condition of an authentication server (not shown) in the service providing server with the first identifier.

The user usage authentication server storage unit 520 stores a second identifier to specify an authentication server and associated a third identifier to specify a user who makes the authentication server as the usage target with the second identifier.

The high reliance authentication server calculation unit 460, based on the reliance condition of the authentication server associated with the first identifier extracted from the authentication server reliance condition storage unit 510, calculates the reliability for each authentication server.

The authentication server selection unit 440, from at least one of the second identifier associated with the third identifier extracted from the user usage authentication server storage unit 520, selects the second identifier including the reliability which satisfies a condition given in advance.

The effect in the present exemplary embodiment mentioned above is a point that it is possible to satisfy both of hiding an authentication server from a service providing server and involving the service providing server in the selection of the authentication server.

This is because, in the authentication mediation server, based on the reliability calculated from the reliance condition associated with a service providing server, an authentication server is made to be selected.

Each exemplary embodiment described above may be optionally combined and be realized.

Each component described in each of the above-mentioned exemplary embodiment, for example, may be a computer execute designated processing by a program.

Each component described in each of the above-mentioned exemplary embodiment, it is not always necessary to be an independent existence, and it may be a configuration of a plurality of components realized as one module, one component realized by a plurality of modules, a certain component being a part of the other components, or a certain part of the component and a part of the other components overlapping.

Further, according to each exemplary embodiment described above, although a plurality of operation has been described in order by the form of the flowchart, the order of the description does not limit the order which carries out a plurality of operation. For this reason, when each exemplary embodiment is put into effect, the order of a plurality of operation can be modified within the scope of not interfering the content.

Further, according to each exemplary embodiment described above, a plurality of operation is not limited to be carried out at different timings respectively. For example, other operation may occur during the execution of a certain operation or the execution timing of a part or the entire part of a certain operation may overlap.

Furthermore, according to each exemplary embodiment described above, although it is described as a certain operation becoming as an opportunity of other operation, the description does not limit any relations between a certain operation and other operation. For this reason, when each exemplary embodiment is put into effect, the relation of a plurality of operation can be modified within the scope of not interfering the content. Further, a detailed description of each operation of each component does not limit each operation of each component. For this reason, when each exemplary embodiment is put into effect, each detailed operation of each component may be modified within the scope of not interfering the characteristics of being functional and efficient or the like.

Further, each component in each exemplary embodiment described above, according to the need and if possible, may be realized by hardware, it may be realized by software, or it may be realized by a mixture of hardware and software.

Further, the physical composition of each component is not limited to the descriptions of the above mentioned exemplary embodiments, and it may exist independently, it may be combined and exist, or, it may be composed separately.

Although the present invention has been described with reference to the exemplary embodiments (and practical examples) above, the present invention is not limited to the above-mentioned exemplary embodiments (and practical examples). Numerous modifications can be devised by a person skilled in the art that will fall within the spirit and scope of the principles of the invention.

This application claims the benefit of priority from Japanese Patent Application No. 2009-071216, filed on Mar. 24, 2009, the disclosure of which is incorporated herein in its entirety by reference.

INDUSTRIAL APPLICABILITY

The present invention can be applied to an authentication mediation server, a mediation method, a program and a mediation system which selects a server suitable for requests of a plurality of user sides, for example, can be applied to an authentication mediation server which mediates an authentication server.

DESCRIPTION OF THE CODES 100 service providing server
110 service providing unit
120 authentication certificate user authentication unit
200 authentication server
210 authentication request receiving unit
220 user authentication unit
300 terminal
400 authentication mediation server
420 authentication server mediation unit
430 authentication request unit
440 authentication server selection unit
450 condition analysis unit
460 high reliance authentication server calculation unit
470 authentication history analysis unit
480 service providing server analysis unit
501 user ID cooperation information
504 user ID cooperation information
510 authentication server reliance condition storage unit
511 authentication server reliance condition information
512 authentication server reliance condition information
514 authentication server reliance condition information
520 user usage authentication server storage unit
521 user usage authentication server information
524 user usage authentication server information
530 authentication server information storage unit
531 authentication server information
540 authentication history storage unit
541 authentication history information

The invention claimed is:

1. A mediation device, comprising:
a reliance condition storage unit which stores a first identifier to specify at least one of first information processing devices and stores associating with the first identifier, reliance conditions to the second information processing devices in the first information processing devices;
a usage target storage unit which stores second identifiers to specify the respective plurality of the second information processing devices and stores associating with the second identifiers, a third identifier to specify a user who makes the second information processing devices as a usage target;
a calculation unit which calculates a reliability for the respective second information processing devices based on the reliance conditions to the second information processing devices which are associated with the first identifier extracted from the reliance condition storage unit; and
a selection unit which selects the second identifier including the reliability which satisfies a condition given in advance, from the second identifiers associated with the third identifier extracted from the usage target storage unit.

2. The mediation device according to claim 1, characterized in that:
the reliance condition is a second identifying information to specify the second information processing device which is defined to be trusted from the first information processing device; and
to calculate the reliability of the respective second information processing device based on the unit number of the first information processing device which is defined to trust the second information specified by the second identifier information referring to the reliance condition.

3. The mediation device according to claim 1, characterized in that:
the reliance condition is an individual reliability associated with a second identifying information which specifies the second information processing device that is defined to be trusted from the first information processing device; and
the calculation unit is to calculate a reliability of the respective second information processing device based on individual reliability.

4. The mediation device according to claim 1, characterized in that:
the reliance condition is an individual reliability associated with a second identifying information which specifies the second information processing device that is defined to be trusted from the first information processing device; and
the calculation unit to calculate a reliability of the respective second information processing device based on the normalized individual reliability as average value of the individual reliability related to each of the first information processing device to become equivalent.

5. The mediation device according to claim 1, further comprising:
a history storage unit which stores the third identifier and a first identifier specifying the first information processing device of a transmission destination of authentication information of the user specified by the third identifier associated with the third identifier; and
a history analysis unit which analyzes a relation between the first information processing devices by referring to the history storage unit; wherein
the selection unit selects the second information processing device defined as to be trusted from the first information processing device with a high possibility that the user is going to make access next with priority, based on analysis result of the history analysis unit.

6. The mediation device according to claim 1, further comprising:
a related analysis unit which obtains information provided to the user from the first information processing device, and analyzes a relation between the first information processing devices based on information related to the first information processing device included in the information; wherein the selection unit selects the second information processing device defined as to be trusted from the first information processing device with a high possibility that the user is going to make access next with priority, based on analysis result of the history analysis unit.

7. The mediation device according to claim 1, further comprising:
a characteristics information storage unit which stores the second identifier and associated characteristics information on the second information processing device specified by the second identifier with the second identifier; wherein
the selection unit selects the second identifier corresponding to the characteristics information that satisfies characteristics condition information which is the reliance condition to the second information processing device extracted from the reliance condition storage unit.

8. A mediation method, comprising:
calculating the reliability for the respective plurality of second information processing devices based on the reliance conditions to the second information processing devices which are associated with the first identifier extracted from the reliance condition information associated a first identifier to specify at least one of the first information processing device with the reliance condition to the second information processing device in the first information processing device; and
selecting the second identifier including the reliability which satisfies a condition given in advance, from the second identifiers associated with the third identifier extracted from the usage target information associated second identifiers to specify the respective plurality of the second information processing devices with a third identifier to specify a user who makes the second information processing devices as a usage target.

9. The mediation method according to claim 8, characterized in that:
the reliance condition is a second identifying information to specify the second information processing device that is defined to be trusted from the first information processing device; and
calculating the reliability of the respective second information processing devices based on the unit number of the first information processing device which is defined to trust the second information specified by the second identifier information referring to the reliance condition.

10. The mediation method according to claim 8, characterized in that:
the reliance condition is an individual reliability associated with a second identifying information which specifies the second information processing device that is defined to be trusted from the first information processing device; and
calculating a reliability of the respective second information processing devices based on the individual reliability.

11. The mediation method according to claim 8, characterized in that:
the reliance condition is an individual reliability associated with a second identifying information which specifies the second information processing device that is defined to be trusted from the first information processing device; and calculating a reliability of the respective second information processing device based on the normalized individual reliability as average value of the individual reliability associated with each of the first information processing device to become equivalent.

12. The mediation method according to claim 8, characterized by referring to a history information by associating the third identifier and a first identifier specifying the first information processing device of a transmission destination of authentication information of a user specified by the third identifier, based on analysis result analyzing a relation between the first information processing devices, selects the second information processing device defined as to be trusted from the first information processing device with a high possibility that the user is going to make access next with priority.

13. The mediation method according to claim 8, characterized in that the mediation method obtains information provided to the user from the first information processing device, based on information related to the first information processing device included in the information and based on analysis result analyzing a relation between the first information processing devices, selects the second information processing device defined as to be trusted from the first information processing device with a high possibility that the user is going to make access next with priority.

14. The mediation method according to claim 8, characterized in that from an authentication server information which associates the second identifier with characteristics information of the second information processing device specified by the second identifier, to select a second identifier specifying a second information processing device corresponding to the characteristics information satisfying characteristics condition information which is reliance condition to the second information processing device.

15. A non-transitory computer-readable recording medium recording thereon a program, comprising that makes a computer to execute the process of:
calculating the reliability for the respective plurality of second information processing devices based on the reliance conditions to the second information processing devices which are associated with the first identifier extracted from the reliance condition information associated a first identifier to specify at least one of the first information processing device with the reliance condition to the second information processing device in the first information processing device; and
selecting the second identifier including the reliability which satisfies a condition given in advance, from the second identifiers associated with the third identifier extracted from the usage target information associated second identifiers to specify the respective plurality of the second information processing devices with a third identifier to specify a user who makes the second information processing devices as a usage target.

16. The non-transitory computer-readable recording medium recording thereon the program according to claim 15, characterized in that:
the reliance condition is a second identifying information which specifies the second information processing device that is defined as to be trusted by the first information processing device; and
makes a computer to execute the process of calculating a reliability of the respective second information processing devices based on the unit number of the first information processing device which defines to trust the second information processing device specified by the second identifying information by referring to the reliance condition.

17. The non-transitory computer-readable recording medium recording thereon the program according to claim 15, characterized in that the reliance condition is an individual reliability associated with a second identifying information which specifies the second information processing device that is defined to be trusted from the first information processing device; and makes a computer to execute the process of calculating a reliability of the respective second information processing devices based on the individual reliability.

18. The non-transitory computer-readable recording medium recording thereon the program according to claim 15, characterized in that:

the reliance condition is an individual reliability associated with a second identifying information which specifies the second information processing device that is defined to be trusted from the first information processing device; and makes a computer to execute the process of calculating a reliability of the respective second information processing devices based on the normalized individual reliability as average value of the individual reliability associated with each of the first information processing device to become equivalent.

19. The non-transitory computer-readable recording medium recording thereon the program according to claim 15, characterized in that makes a computer to execute the process of selecting the second information processing device defined as to be trusted from the first information processing device with a high possibility that the user is going to make access next with priority by referring to a history information by associating the third identifier and a first identifier specifying the first information processing device of a transmission destination of authentication information of the user specified by the third identifier, based on analysis result analyzing a relation between the first information processing devices.

20. The non-transitory computer-readable recording medium recording thereon the program according to claim 15, characterized in that the program makes a computer to execute the process of selecting the second information processing device defined as to be trusted from the first information processing device with a high possibility that the user is going to make access next with priority by obtaining information provided to the user from the first information processing device, based on information related to the first information processing device included in the information and based on analysis result analyzing a relation between the first information processing devices.

21. The non-transitory computer-readable recording medium recording thereon the program according to claim 15, characterized in that the program makes a computer to execute the process of selecting a second identifier specifying a second information processing device corresponding to the characteristics information satisfying characteristics condition information which is reliance condition to the second information processing device, from an authentication server which associates the second identifier with characteristics information of the second information processing device specified by the second identifier.

22. A mediation system, comprising:
a first information processing device;
a second information processing device;
a third information processing device; and
an mediation device; wherein the third information processing device sends an identifier of an mediation device and a third identifier to the first information processing device; wherein the first information processing device, based on an identifier of the received mediation device, sends the third identifier and first identifier to the mediation device; wherein the mediation device comprises a reliance condition storage unit which stores a first identifier to specify at least one of first information processing device and stores associating with the first identifier, reliance conditions to the second information processing device in the first information processing device; wherein a usage target storage unit which stores second identifiers to specify the respective plurality of the second information processing devices and stores associating with the second identifiers, a third identifier to specify a user who makes the second information processing devices as a usage target; wherein a calculation unit which calculates the reliability for the respective second information processing device based on the reliance conditions to the second information processing devices which are associated with the first identifier extracted from the reliance condition storage unit; and a selection unit which selects the second identifier including the reliability which satisfies a condition given in advance, from the second identifiers associated with the third identifier extracted from the usage target storage unit.

23. The mediation system according to claim 22, characterized in that:

the reliance condition is a second identifying information to specify the second information processing device which is defined to be trusted from the first information processing device; and the mediation system calculates the reliability of the respective second information processing devices based on the unit number of the first information processing device which is defined to trust the second information specified by the second identifier information referring to the reliance condition.

24. The mediation system according to claim 22, characterized in that:

the reliance condition is an individual reliability associated with a second identifying information which specifies the second information processing device that is defined to be trusted from the first information processing device; and the calculation unit is to calculate a reliability of the respective second information processing device based on individual reliability.

25. The mediation system according to claim 22, characterized in that:

the reliance condition is an individual reliability associated with a second identifying information which specifies the second information processing device that is defined to be trusted from the first information processing device; and the calculation unit to calculate a reliability of the respective second information processing devices based on the normalized individual reliability as average value of the individual reliability related to each of the first information processing device to become equivalent.

26. The mediation system according to claim 22, further comprising:
- a history storage unit which stores the third identifier and a first identifier specifying the first information processing device of a transmission destination of authentication information of the user specified by the third identifier in association with the third identifier; and
- a history analysis unit which analyzes a relation between the first information processing devices by referring to the history storage unit; wherein
- the selection unit selects the second information processing device defined as to be trusted from the first information processing device with a high possibility that the user is going to make access next with priority, based on analysis result of the history analysis unit.

27. The mediation system according to any one of claim 22, further comprising:
- a related analysis unit which obtains information provided to the user from the first information processing device, and analyzes a relation between the first information processing devices based on information related to the first information processing device included in the information; wherein
the selection unit selects the second information processing device defined as to be trusted from the first information processing device with a high possibility that the user is going to make access next with priority, based on analysis result of the history analysis unit.

28. The mediation system according to claim 22, further comprising:
- a characteristics information storage unit which stores the second identifier and associated characteristics information on the second information processing device specified by the second identifier with the second identifier; wherein
- the selection unit selects the second identifier corresponding to the characteristics information that satisfies characteristics condition information which is the reliance condition to the second information processing device extracted from the reliance condition storage unit.

29. A mediation device, comprising:
- a reliance condition storage means for storing a first identifier to specify at least one of the first information processing devices and associated reliance conditions to the second information processing devices in the first information processing devices with the first identifier;
- a usage target storage means for storing second identifiers to specify the respective plurality of the second information processing devices and associated a third identifier to specify a user who makes the second information processing devices as a usage target with the second identifiers;
- a calculation means for calculating a reliability for the respective second information processing devices based on the reliance conditions to the second information processing devices which are associated with the first identifier extracted from the reliance condition storage means; and
- a selection means for selecting the second identifier including the reliability which satisfies a condition given in advance, from the second identifiers associated with the third identifier extracted from the usage target storage means.

30. A mediation system, comprising:
a first information processing device;
a second information processing device;
a third information processing device; and
an mediation device; wherein
the third information processing device sends an identifier of an mediation device and a third identifier to the first information processing device; wherein
the first information processing device, based on an identifier of the received mediation device, sends the third identifier and first identifier to the mediation device; wherein
the mediation device comprises a reliance condition storage means for storing a first identifier to specify at least one of the first information processing device and associated reliance conditions to the second information processing device in the first information processing device with the first identifier; wherein
a usage target storage means for storing second identifiers to specify the respective plurality of the second information processing devices and associated a third identifier to specify a user who makes the second information processing devices as a usage target with the second identifiers; wherein
a calculation means for calculating the reliability for the respective second information processing device based on the reliance conditions to the second information processing devices which are associated with the first identifier extracted from the reliance condition storage means; and
a selection means for selecting the second identifier including the reliability which satisfies a condition given in advance, from the second identifiers associated with the third identifier extracted from the usage target storage means.

* * * * *